(12) United States Patent
Du et al.

(10) Patent No.: US 11,062,212 B2
(45) Date of Patent: Jul. 13, 2021

(54) OUTAGE PREVENTION IN AN ELECTRIC POWER DISTRIBUTION GRID USING SMART METER MESSAGING

(71) Applicant: Florida Power & Light Company, Juno Beach, FL (US)

(72) Inventors: Yinuo Du, Palm Beach Gardens, FL (US); Andrew Wright Kirby, Jupiter, FL (US); Adam David Meranda, Jupiter, FL (US)

(73) Assignee: Florida Power & Light Company, Juno Beach, FL (US)

( * ) Notice: Subject to any disclaimer, the term of this patent is extended or adjusted under 35 U.S.C. 154(b) by 0 days.

(21) Appl. No.: 16/686,750

(22) Filed: Nov. 18, 2019

(65) Prior Publication Data

US 2020/0151581 A1 May 14, 2020

Related U.S. Application Data

(63) Continuation of application No. 15/002,180, filed on Jan. 20, 2016, now abandoned.
(Continued)

(51) Int. Cl.
*G06N 5/00* (2006.01)
*G06N 20/00* (2019.01)
*G06Q 50/06* (2012.01)

(52) U.S. Cl.
CPC ............ *G06N 5/003* (2013.01); *G06N 20/00* (2019.01); *G06Q 50/06* (2013.01); *Y04S 10/50* (2013.01)

(58) Field of Classification Search
CPC ........ G06N 5/003; G06N 20/00; G06Q 50/06; Y04S 10/50
(Continued)

(56) References Cited

U.S. PATENT DOCUMENTS 7,966,150 B2  6/2011  Smieth et al.
8,779,927 B2  7/2014  Bell et al.
(Continued)

FOREIGN PATENT DOCUMENTS

WO   WO2009067250   5/2009

OTHER PUBLICATIONS

Tsai, C. F., &Tsai, J. H. (Mar. 2010). Performance Evaluation of the Judicial System in Taiwan Using Data Envelopment Analysis and Decision Trees. 2010 Second International Conference on Computer Engineering and Applications; vol. 2. pp. 290-294. IEEE. (Year: 2010).*

(Continued)

*Primary Examiner* — Kamini S Shah
*Assistant Examiner* — John E Johansen
(74) *Attorney, Agent, or Firm* — Jon Gibbons; Fleit Intellectual Property Law

(57) ABSTRACT

A system and method is disclosed for using AMI smart meter messaging types and data mining decision trees to determine if local equipment failure is present. The system and method may be used to predict impending failure based upon smart meter message behaviors and to create proactive investigation tickets. The predictions models may be generated from a database of smart meter messaging and customer outage reports. The system and method can be applied to detect failures of higher level device equipment and may be incorporated into customer service processes. The system and method may also be used to determine customer owned equipment failures for referral to electricians.

32 Claims, 18 Drawing Sheets

Related U.S. Application Data

(60) Provisional application No. 62/173,039, filed on Jun. 9, 2015.

(58) Field of Classification Search
   USPC .......................................................... 703/13
   See application file for complete search history.

(56) References Cited

U.S. PATENT DOCUMENTS

| | | | |
|---|---|---|---|
| 8,892,375 B2* | 11/2014 | Taft ........................ | G01D 4/002 702/58 |
| 2005/0090995 A1 | 4/2005 | Sonderegger | |
| 2006/0117059 A1* | 6/2006 | Freeman, Jr. ....... | G06F 11/3447 |
| 2009/0125155 A1 | 5/2009 | Hill et al. | |
| 2011/0282508 A1* | 11/2011 | Goutard ................. | H04L 63/20 700/293 |
| 2012/0200423 A1 | 8/2012 | DiLuciano et al. | |
| 2013/0066570 A1* | 3/2013 | Sfaelos ................. | G06Q 50/06 702/62 |
| 2013/0338945 A1 | 12/2013 | Feng | |
| 2014/0114829 A1 | 4/2014 | Forbes, Jr. | |
| 2015/0051749 A1 | 2/2015 | Hancock et al. | |
| 2015/0215177 A1* | 7/2015 | Pietrowicz ............ | H04W 24/10 370/230 |

OTHER PUBLICATIONS

British Gas. (Mar. 2010). Product Requirements for Smart Metering Systems Part 1: General System Architecture. Final V4.0 Mar. 29, 2010. Mar. 2010. pp. 1-64. (Year: 2010).*

International Search Report Written Opinion in corresponding International Application No. PCT/US16/027754, dated Jul. 15, 2016, United States International Searching Authority, US/ISA.

C. Tsai and J. Tsai, "Performance Evaluation of the Judicial System in Taiwan Using Data Envelopment Analysis and Decision Trees," 2010 Second International Conference on Computer Engineering and Applications, Bali Island, 2010, pp. 290-294.

British Gas. (Mar. 2010). Product Requirements for Smart Metering Systems Part 1: General System Architecture. Final V4.0 Mar. 29, 2010. Mar. 2010. pp. 1-64.

Written Opinion in corresponding International Application No. PCT/US16/027754, dated Jul. 15, 2016, United States International Searching Authority, US/ISA.

Kohavi, Ron et al. Decision Tree Discovery Technical Paper updated Oct. 10, 1999.

* cited by examiner

FIG. 10

| IRPT_TYPE_CODE | TCKT_TYPE_CODE | | | | | | | | |
| --- | --- | --- | --- | --- | --- | --- | --- | --- | --- |
| | FDR | LAT | LATU | NLS | SNC | SNCU | TX | TXU | Total |
| FDR | 72 | 0 | 5 | 0 | 0 | 0 | 0 | 0 | 77 |
| LAT | 0 | 126 | 84 | 0 | 0 | 0 | 0 | 11 | 221 |
| NLS | 38 | 0 | 3 | 33 | 15 | 13 | 8 | 0 | 110 |
| SEC | 0 | 0 | 0 | 0 | 2 | 1 | 5 | 9 | 17 |
| SV | 0 | 0 | 0 | 5 | 25 | 6 | 8 | 0 | 44 |
| TX | 0 | 18 | 0 | 1 | 2 | 1 | 73 | 0 | 95 |
| UNSP | 0 | 0 | 0 | 1 | 0 | 0 | 4 | 0 | 5 |
| Total | 110 | 144 | 92 | 40 | 44 | 21 | 98 | 20 | 569 |

FIG. 11

Flag.1 Means Premise Experience Interruption

List of Event Concentrations by Meter (% shown as whole number)

Spreadsheet continues at right → for 82 event types (including zero voltage reads)

| | A | B | C | D | E | F | G | H | I | J | K | L | M | N |
|---|---|---|---|---|---|---|---|---|---|---|---|---|---|---|
| 1 | Interruption Flag | premise number | Broadcast NM Complete Event | Broadcast Tx Event | Broadcast No Broadcast Rx Event | Broadcast Tx Event | CVR out of Spec | DC Detection | DC Detection Cleared | DC Error Cleared | DC Error Detected | GMI Channel Reading Rollover Event | GMI Channel Suspicious Rollover Event | GMI Meter Status Met Not Ready |
| 2 | 1 | 1.28E+10 | 0 | 0 | 0 | 0 | 0 | 0 | 0 | 2 | 2 | 0 | 0 | 0 |
| 3 | 1 | 1.28E+10 | 0 | 0 | 0 | 0 | 0 | 0 | 0 | 7 | 7 | 0 | 0 | 0 |
| 4 | 1 | 1.29E+10 | 0 | 0 | 0 | 0 | 0 | 0 | 0 | 0 | 0 | 0 | 0 | 0 |
| 5 | 1 | 1.29E+10 | 0 | 0 | 0 | 0 | 1 | 0 | 0 | 0 | 0 | 0 | 0 | 0 |
| 6 | 0 | 1.3E+10 | 0 | 0 | 0 | 0 | 0 | 0 | 0 | 1 | 1 | 0 | 0 | 0 |
| 7 | 0 | 1.3E+10 | 0 | 0 | 0 | 0 | 0 | 0 | 0 | 2 | 2 | 0 | 0 | 0 |
| 8 | 0 | 1.3E+10 | 0 | 0 | 0 | 0 | 0 | 0 | 0 | 1 | 1 | 0 | 0 | 0 |

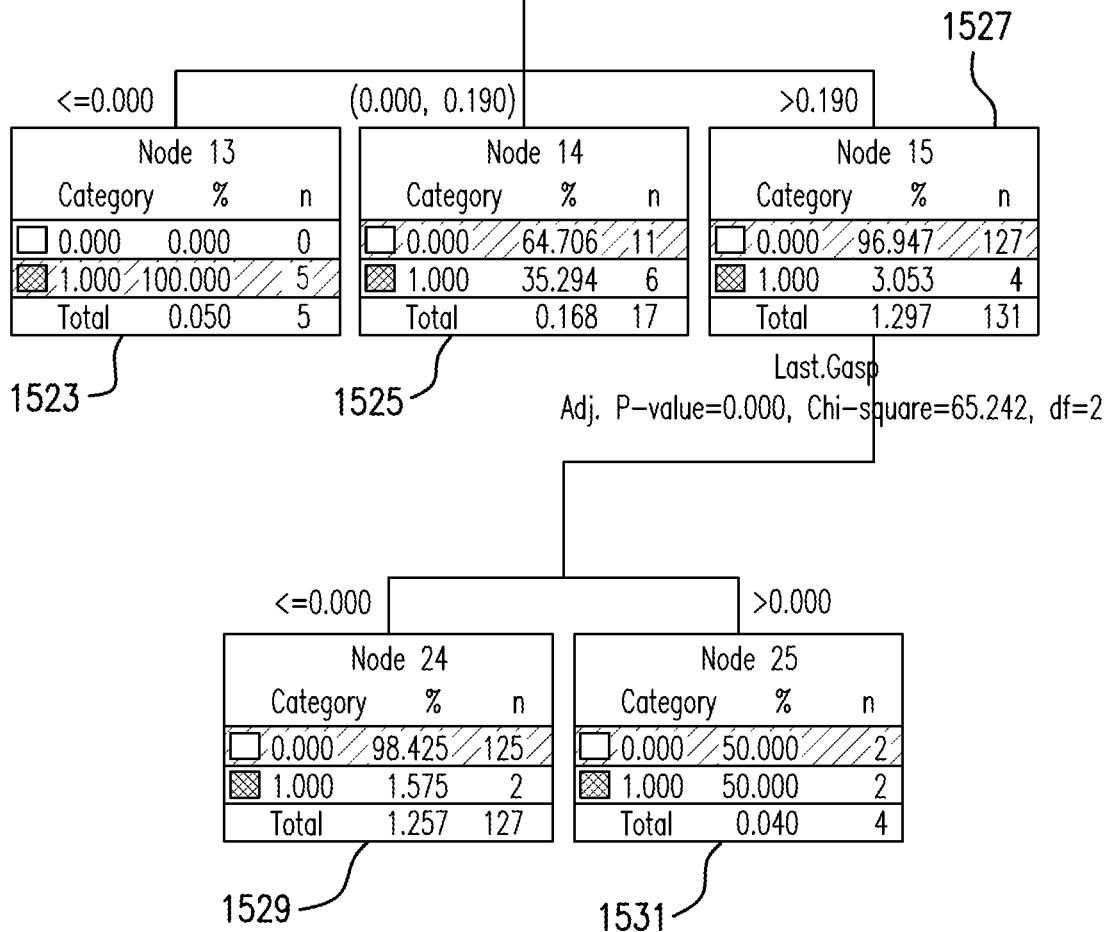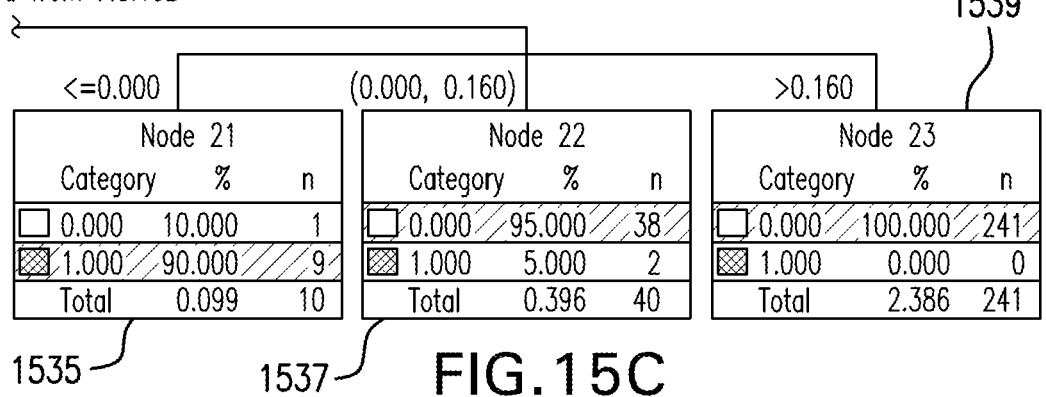
FIG.15C

OUTAGE PREVENTION IN AN ELECTRIC POWER DISTRIBUTION GRID USING SMART METER MESSAGING

CROSS-REFERENCE TO RELATED APPLICATIONS

This application claims is a continuation of U.S. patent application Ser. No. 15/002,180, filed on Jan. 20, 2016, which claims priority from U.S. Provisional Patent Application Ser. No. 62/173,039, filed Jun. 9, 2015, the entire contents of each application is hereby incorporated by reference in their entirety.

FIELD OF THE DISCLOSURE

The present disclosure relates to a system and method for utilizing smart meter messages to predict deficient elements of an electric power distribution grid prior to a customer reporting of an outage.

BACKGROUND

Electrical power distribution grids can be implemented as radial, loop or network type systems. The distribution grids are arranged and interconnected to a substation in different ways depending on the type of system configuration. However for each type of distribution system configuration, the distribution circuits (commonly referred to as feeders and lateral feeders) distribute power delivered from the substation to loads at premises coupled to the grid through smart meters.

Various types of faults can occur in an electrical distribution system, some of which result in power outages, i.e., the loss of electric power service to customers. For example, a short circuit fault causes the protective element upstream of the fault to open isolating the short circuit fault from the grid. A short circuit may be caused by a tree branch contacting power lines during a storm for example. Customers downstream of the opened protective element become de-energized resulting in an outage. Another type of fault is an open conductor element fault that similarly causes the downstream customers to experience a power outage. An open conductor element may be caused by a power line snapping during a storm, or a coupling joining two power lines becoming deficient and then failing thereby resulting in the open conductor.

Power outage analysis conventionally relies on customer phone calls made to the utility company in the event of a power outage as the main information source for such analysis. This process can be quite slow because many customers may not call to report an outage, and those who do report an outage may wait a relatively long period of time to report the outage, often assuming a neighboring customer will call in their stead. With the wide deployment of AMR (automatic meter reading) and AMI (advanced metering infrastructure) technologies in power distribution systems, timelier message information is available from smart meters. However, smart meters may not be designed to specifically detect deficient grid element and generate a corresponding message. Furthermore smart meters generate a multiplicity of message types, each of which has been shown to be an unreliable indicator of a service interruption that would qualify as an outage that requires a repair to an element of the power distribution grid.

When a customer contacts the utility to report an outage, a repair crew is then dispatched to determine the deficient grid element, performing fault reparation and ultimately service restoration. However, repairs have not been implemented until after a customer experiences an outage and has taken the steps to contact the utility. Then the customer waits without power until a repair crew is dispatched, the cause of the outage is determined and power restored, thereby leading to a degraded quality of service and increasing customer dissatisfaction.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate the scope of the system and method disclosed herein. Its sole purpose is to present some concepts of the disclosure in a simplified form as a prelude to the more detailed description that is presented later.

The system and method of the present disclosure generally relate to the use of AMI messaging types and data mining decision trees to determine if local equipment failure is present. The system and method may be used to predict impending failure and to create proactive investigation tickets. The system and method can be applied to detect failures of higher level device equipment and may be incorporated into customer service processes (troubleshooting during first customer contact). Further, the system and method may also be used to determine customer owned equipment failures for referral to electricians (inside the premises trouble).

The following description and the annexed drawings set forth in detail certain illustrative aspects of the disclosure. These aspects are indicative, however, of but a few of the various ways in which the principles of the system and method disclosed herein may be employed and the system and method disclosed herein is intended to include all such aspects and their equivalents. Other advantages and novel features of the system and method disclosed herein will become apparent from the following detailed description of the system and method disclosed herein when considered in conjunction with the drawings.

BRIEF DESCRIPTION OF THE DRAWINGS

FIG. 10 illustrates an exemplary set of event messages retrieved from an AMI database in accordance with one implementation.

FIG. 11 illustrates a combination of ticket and interruption types that may be analyzed in one implementation.

FIG. 13 illustrates a sample of the data prepared for input into a data mining engine in accordance with one implementation.

FIG. 14 illustrates a sample screenshot of a data extraction process in accordance with one implementation.

FIGS. 15A-C illustrate a decision tree that may be used to predict power failures in accordance with one implementation.

DESCRIPTION OF ILLUSTRATIVE IMPLEMENTATIONS

The system and method disclosed herein will now be described more fully hereinafter with reference to the accompanying drawings, in which preferred implementations of the system and method disclosed herein are shown. The system and method disclosed herein may, however, be implemented in many different forms and should not be construed as limited to the implementations set forth herein. Rather, these implementations are provided so that this disclosure will be thorough and complete, and will fully convey the scope of the system and method disclosed herein to those skilled in the art.

The systems and methods described herein may be implemented as a method, data processing system, or computer program product. Accordingly, the description may take the form of an entirely hardware embodiment, an entirely software embodiment, an embodiment combining software and hardware aspects, a computer program product on a computer-usable storage medium having computer readable program code on the medium, a non-transitory computer readable storage medium, or combinations thereof. Any suitable computer readable medium may be utilized including, but not limited to, static and dynamic storage devices, hard disks, optical storage devices, and magnetic storage devices.

The present system and method is described below with reference to illustrations of methods, systems, and computer program products according to the disclosed implementations. It will be understood that blocks of the illustrations, and combinations of blocks in the illustrations, can be implemented by computer program instructions, hardware devices, or a combination of both. These computer program instructions may be provided to a processor of a general purpose computer, special purpose computer, or other programmable data processing apparatus to produce a particular machine, such that the instructions, which execute via the processor of the computer or other programmable data processing apparatus, implement the functions specified in the block or blocks.

The disclosed system and method may be implemented on one or more computing devices, including one or more servers, one or more client terminals, including computer terminals, a combination thereof, or on any of the myriad of computing devices currently known in the art, including without limitation, personal computers, laptops, notebooks, tablet computers, touch pads (such as the Apple iPad, SmartPad Android tablet, etc.), multi-touch devices, smart phones, personal digital assistants, other multi-function devices, stand-alone kiosks, etc.

Figure 16:
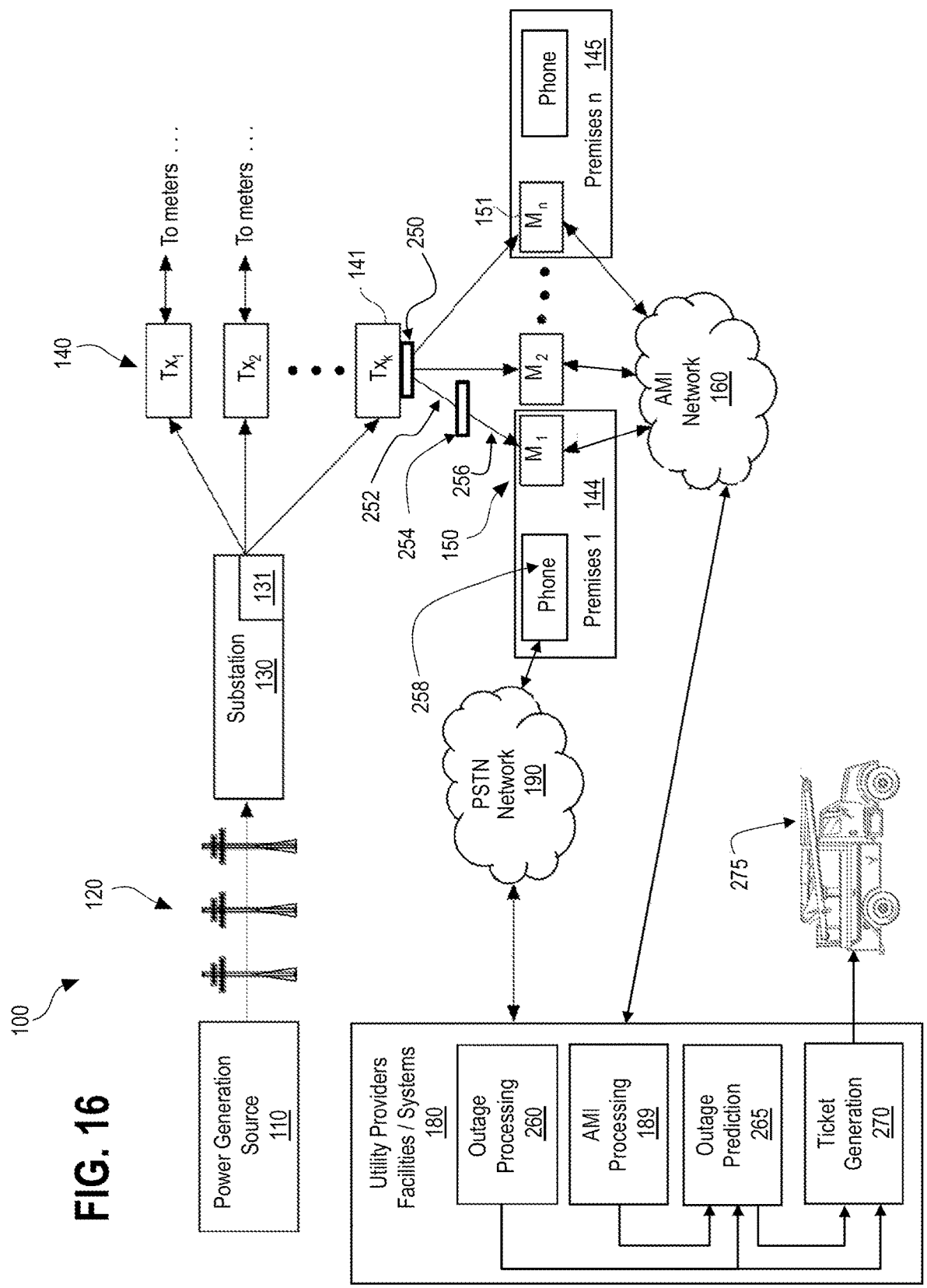
FIG. 16 is a simplified block diagram illustrating components of a metered electric utility distribution system.

First, turning to FIG. 16, FIG. 16 illustrates a simplified block diagram of elements of an electric power distribution system. The distribution system 100 includes a power generation source 110 that is operative to generate electric power in accordance with one or more technologies and to distribute the electric power via transmission lines 120. In that regard, source 110 may employ or included a hydroelectric plant, a fossil fuel or coal-fired plant, a nuclear plant, a wind farm or a solar array or collector and attendant structures, a geothermal plant, or a combination of these and other facilities that are known or developed in accordance with known principles and technologies to generate electric power. Nuclear reactors, steam, gas, or water-driven turbines, rotors, stators, solar panels, cooling towers, and various other ancillary equipment and machinery are omitted from FIG. 16 for clarity, but may be employed at or in cooperation with source 110 as is generally known, and it will be appreciated that these omitted details may be application-specific. In some implementations, transmission lines 120 may carry high-voltage Alternating Current (or "AC") electric power from source 110 to a desired destination as is generally known, though other technologies for distributing electric power across distances, as may be appropriate for a particular application and based upon technological readiness and suitability, are contemplated. In particular, the present disclosure is not intended to be limited by the structural or operational characteristics of source 110 or transmission lines 120, or by the nature of the electric power and the manner in which it is generated or transmitted.

In some practical applications, electric power generated at source 110 may be transmitted via transmission lines 120 to a power transfer substation 130 which, in turn, distributes electric power to transformers ($Tx_1$, $Tx_2$, ... $Tx_n$) 140-141 for subsequent transmission to a multiplicity of premises or a group of premises 144-145 having a corresponding group of smart meters that are generally represented as meters ($M_1$, $M_2$, ... $M_n$) 150-151. It is noted that electric power distribution system 100 may generally include more power generation sources (such as source 110) and more substations (such as substation 130) than depicted in FIG. 16, and that each such substation 130 may serve many more transformers (such as transformers 140) than illustrated. Similarly, each such transformer 140, such as specific transformer 141, may provide electric power to more premises and smart meters (such as meters 150-151) than are depicted in FIG. 16. In that regard, the present disclosure is not intended to be limited by the simplified topography represented in the drawing figures.

In operation, substation 130 may modify or condition the electricity received from source 110 such that it may then be transmitted to transformers 140. For example, it may be desirable in some circumstance to step down (or to step up) voltage via one or more substation transformers 131, or to phase-shift or otherwise to adjust current phase or amplitude, for instance, to achieve a desired power function as specified by the kind of load and/or to minimize energy lost in the distribution system. Various techniques are known or may be developed to condition electric power at substation 130, and the present disclosure is not intended to be limited by the operation of substation 130 or by any technical procedures executed or functionality employed there.

Similarly, transformers 140-141 may be configured and operative further to condition the electric power received from substation 130 such that it is suitable for delivery to customers or loads associated with smart meters 150-151. Voltage manipulation, current manipulation, or a both, may be employed in various situations; the nature and extent of such conditioning may be dependent upon the specifications and operational characteristics of the smart meters 150-151 to which electric power is delivered, for example, or upon governmental regulations, technological or infrastructure capabilities, or a combination of these and other factors. The present disclosure is not intended to be limited by the technologies employed at transformers 140-141.

Smart meters 150-151 may be configured to measure electric power consumed at each corresponding premises and generate a multiplicity of message types related to meter electric power usage at a particular premises such as a residence, building, business location, or some other specific site. In some circumstances (where available from and supported by a particular utility service provider, for instance, or where required by a state or local utility oversight commission or committee), meters 150-151 may be operated in accordance with Advanced Metering Infrastructure (or "AMI") specifications or protocols.

In that regard, meters 150-151 may be configured as or include what are generally referred to as "smart meters" or "AMI meters." In operation, when implemented as a smart meter, Meters 150-151 may monitor, sense, record, or otherwise track electrical consumption (or "usage") digitally and at predetermined or dynamically adjustable intervals; subsequently or effectively contemporaneously, meters 150-151 may transmit usage data (e.g., using a secure radio frequency band or other telecommunications methodology) to other devices installed on or otherwise communicably coupled to the electrical grid or to a communications network (such as AMI network 160) with which meters 150-151 may exchange data. In this context, it will be understood that "usage data" may refer to raw data (i.e., unmodified or unprocessed data as they are collected and that represent the amount of electrical energy consumed at the location metered by meters 150-151) or to data and other information relating to or derived from such raw data (e.g., readings or data points that may be time-stamped or otherwise processed to provide more information than simply an aggregate or a measure of cumulative consumption). For example, in some instances, an aggregate usage value may be transmitted from such a smart meter, while in other instances, detailed, time-dependent usage rates may be transmitted; the specific type and amount of data collected and processed at, and transmitted from, meters 150-151 may be application-specific and may vary in accordance with processing or computational capabilities of hardware components deployed in, as well as software functionalities implemented at or in cooperation with, meters 150-151. These factors may be affected by technological or economic considerations, for example, or may be dictated or influenced by applicable governing bodies or governmental regulations.

As illustrated in FIG. 16, smart meters, such as meters 150-151, may be communicably coupled to AMI network 160 such that messages including usage data collected (and possibly processed) by meters 150-151 may be transmitted to AMI network 160.

In operation, AMI network 160 may be communicably coupled to a utility provider's facilities and computer systems (hereinafter generally referred to as "systems" 180). The AMI network may include the Internet, for instance, or any other packet-switched data network, virtual private network, proprietary or public wide area network ("WAN"), or any other communications network capable of bi-directional data communication between AMI network 160 and systems 180.

At a service provider's facilities, systems 180 generally include processing and billing systems, various monitoring, customer service, troubleshooting, maintenance, load balancing, accounting, and other types of activities that may be used to operate a utility service. In some instances where such activities are computationally expensive or require a great deal of processor power or communication bandwidth, some implementations of processing may be distributed across many processing and memory storage resources, and even distributed across buildings as is generally known in the art. Accordingly, though systems 180 are depicted in FIG. 16 as a single, unified entity, it will be appreciated that block 180 may represent any number of physical buildings, computer server facilities, and other physical and logical resources owned, operated, or otherwise under the control of the relevant utility service provider.

The discussion below turns to more particular implementations of the present disclosure. A customer such as a customer located at premises 1, 144 may experience an interruption in service, or an outage. An outage may result from an electric power distribution grid having any of a multiplicity of elements becoming deficient of failing. The elements include any component of the grid coupling power generation source 110 to premises 144, including power generation source 110. If an element between or including power generation source 110 and transformer 140 becomes deficient and fails, then a multiple premise outage may result.

A single premise outage may occur if an element between transformer 151 and premises 144 becomes deficient or fails. A single premises outage may occur for any of a multitude of reasons. In one example transformer 142 has a power coupling 250 for providing power to premises 1 through n, 144-145. If a portion of power coupling element 250 becomes deficient, such connection corrosion or insulation deterioration, then an outage at premises 144 may occur. If power distribution line 252 becomes deficient, either by corrosion or high impedance leakage or a fault in an underground conduit, then an outage at premises 144 may occur. If a deficiency in power coupling elements 245, which may couple copper lines 256 from premises 144 to aluminum lines 252 results is a failure, then an outage at premises 144 may occur. If copper power distribution line 254 becomes deficient, either by corrosion or high impedance leakage or a fault in an underground conduit, then an outage at premises 144 may occur. If meter M1, 150, becomes deficient, then an outage at premises 144 may occur.

In response to an outage, the customer contacts the utility 180 via telephone 258 and an outage report or outage notice is generated by outage processing process 260. Telephone 258 is coupled to the utility via a public switched telephone network (PSTN) 190. Is should be noted that the PSTN network 190 for communicating telephone calls from a customer at premises 144 to utility 180, is a separate network from the AMI network 160 used for communicating smart meter messages from smart meter 150 at premises 144 to utility 180, even though various components may be shared between networks, such as internet or cellular networks. The PSTN network 190 is used for customer communications with the utility and the AMI network 160 is used for smart meter message communication with the utility. The PSTN and AMI networks operate independently and facilitate different types of communication. In other examples, alternate communication devices, other than phone 258, may be utilized to communicate an outage from a customer to the utility while remaining within the scope of this description. Other devices may include smart phones, personal computers or other devices for customers to communicate with the utility.

In response to an outage report, outage processor 260 process the outage report and determines an appropriate response. Ticket generator 270 then generates a ticket via a ticket output device in the form of a humanly observable repair ticket (such as a printed page or display on a computer screen) indicative of the prediction, thereby enabling a repair crew 275 to repair the deficient grid element associated with the outage at the premises. The findings of the repair crew may then add to the outage report. The outage processor may use a number of approaches known to those familiar in the art for determining an appropriate response. Such approaches may include analyzing a multitude of outage reports from a multitude of premises. In order to keep customer satisfaction high and to reduce maintenance costs, it is desirable to reduce the amount of tickets and the amount of repair work associated with the grid.

Tickets issued to correct problems with feeders (FDRs), which may be defined as main power lines traveling out of a substation, with laterals (LATs), which may be defined as fused power lines traveling off the main line feeder, with substations (SUBs), and with transformers (TXs) are conventionally responsible for the ample majority of service interruptions. FDR, LAT, SUB and TX tickets may be responsible for more than 97% of customer outages but only produce less than 12% of the repair ticket volume.

In addition to the aforementioned types of tickets, other types of tickets that may be handled by a utility include Part no Current ("PNC") ticket, which may indicate partial power problem, for example when there is one hot leg and a residential home cannot use a 220V electrical appliance; an Oil Circuit Recloser ("OCR") ticket, which may be defined as an outage ticket type where the suspected device being out of service is an OCR (field recloser); an OTH-SEC ticket (outage interruption type Other—Secondary); an OTH—SV ticket (outage interruption type Other—Service); and an UNSP ticket (outage interruption type—Unspecified). Each of these also represents an outage ticket type—if there is loss of power to a feeder then the ticket may be called a feeder ticket, FDR. If a single customer reports loss of power and no one else on the same line or transformer is reporting a problem, then the ticket may be considered an SNC ticket.

By contrast, single premises events may be responsible for less than 3% of the customer outages while generate over 74% of the repair ticket volume, thereby making up the majority of restoration work of an electric power distribution grid utility's maintenance fleet. Single premises events include single no current (SNC) tickets, which may relate to a single customer or meter reporting a loss of power, no loss of service (NLS) tickets, which may relate to an outage ticket type generated when a customer is reporting that there is no sustained outage or interruption of electric service at the time, and location (LOC) tickets, which may relate to an outage ticket type where the suspected device cannot be identified. Thus, single premises events result in high number of tickets. Reducing single premises events may significantly improve the quality of service provided to customers of a utility providing electric power to customers. Consequently, it may be advantageous to predict the occurrence of single premises events before an outage is reported.

In the present disclosure, a "bad truck roll" may be defined as a situation when either no utility problem exists or an investigator is unable to determine the problem and yet the investigator makes a trip to a premises or location to conduct an investigation based upon a ticket. One potential advantage of the present disclosure is to reduce investigator volume.

A single premises event or outage may typically result from a failure related to grid elements 250-256. Smart meter 150 is able to generate a message as a result of an outage, such as a last-gasp message. As will be detailed with respect to FIG. 6, reception of a single last gasp message (or multiple last gasp messages generated by a single smart meter) by AMI processing function 189 is typically not reliable enough to substitute for an outage report generated in response to a customer call. Furthermore, elements of the power grid, such as elements 250-256 become deficient slowly before a failure results in an outage. Power couplings may slowly corrode before failure, insulators may slowly become contaminated before failure, underground cable may slowly degrade before failure and/or, vermin may slowly destroy elements before failure. In order to reduce the occurrence of single premises events and improve the quality of power delivered to the customer, it may be advantageous to detect elements becoming deficient before a failure resulting in an outage occurs.

While smart meters generate a multiplicity of messages, the messages do not include information specifying a deficient grid element. For example, smart meter messages do not specify deficient power couples 250 or 254, nor do they specify deficient lines 252 or 256. However, the inventors have discovered how to determine a smart meter message behavior that is indicative of deficient grid elements and predictive of future outages, and then apply the smart meter message behavior to messages received by smart meters in the grid to identify a suspect premises and generate a ticket to enable a repair crew to begin investigation and/or repair a deficient grid element prior to an outage being reported by a customer.

While the objective of predicting and repairing a grid element prior to an occurrence of a single premises outage task is simply stated, realizing the objective compounded by the enormity of data and the extremely low percentage of premises experiencing single premises outages. For example, in a twenty four hour period, in a group of six hundred thousand premises, corresponding smart meters may generate over one million two hundred thousand event messages having over two hundred and eighty message types. In that twenty four hour period, only sixty single premises outages may occur, or one in ten thousand or zero point zero one percent. Finding message patterns for predicting single premises outages in such a mass of big data when the smart meter messages do not themselves specify a deficient grid element has been compared to finding a needle in a haystack.

An objective of the present disclosure is to generate tickets before receiving a customer call to report an outage. Still another objective of the present disclosure is to restore power at a premise before a customer residing in that premises calls to report an outage. Still another objective of the present disclosure is to dispatch a repair crew before a customer residing in that premises calls to report an outage. While repairing a deficient grid element prior to an outage results in a high quality of customer service, repairing deficient grid element resulting in an outage before a customer calls and an outage report is generated is an improvement in customer service quality and customer satisfaction.

Further still, dispatching a repair crew to a premises prior to receiving an outage call is also an improvement in customer service, even though the customer had to call the utility, the utility can respond that a deficient element was detected and a repair crew has already been dispatched prior to the customer placing the call.

Thus, FIG. 16 shows an electric power distribution system 100 comprising an electric power distribution grid having a multiplicity of elements 250-256 capable of becoming deficient, a multiplicity of smart meters 150-151 coupling the electric power distribution grid and a corresponding multiplicity of premises 144-145, each smart meter measuring electric power consumed at each corresponding premises and generating a multiplicity message types related thereto, the multiplicity of message types not including information specifying a deficient grid element. FIG. 16 also shows an automated meter infrastructure network 160 coupled to the smart meters for communicating the messages from the smart meters and a message database within AMI processor 189 coupled to the automated meter infrastructure network for receiving messages from the multiplicity of smart meters, and an outage processor 260 for receiving outage reports through a communication network 190 different from the automated meter infrastructure network 160, each outage report associated with a failed deficient grid element. FIG. 16 also shows an outage predictor 265 for processing the additional messages with the plurality of models to predict a likelihood of an outage at a suspect premises based upon messages from smart meters, and a ticket generator 270 for generating a ticket enabling a repair crew to repair a deficient grid element associated with the suspect premises.

While a detailed description of a process for identifying message behaviors related to deficient smart grid elements is included with respect to FIG. 1 through FIG. 15, introductory comments regarding the process for identifying message behaviors and affecting repairs are provided in the following paragraphs.

In accordance with one implementation, a data mining process may be applied to messages having event data transmitted by smart meters. A data mining process may be defined as a process of analyzing data from many different perspectives, which may allow, for example, viewing information from many different perspectives or "angles" at the same time. For example, instead of sampling data points, the entire population of available data may be used to find patterns predictive of outages. In accordance with one implementation, the process data mines smart meter messages to look for patterns indicating whether a future single premises interruption may be likely to occur.

To predict outages, one of the methods of the present implementation may rely on event correlation. Meters send structured messages, which include event information, over the AMI network. A history of smart meter messages received over the AMI network and a corresponding history of outage reports received over the PSTN network may be analyzed. In one implementation, a process receives these structured smart meter messages and filters out duplicate messages. Duplicate messages may be received since the same message generated at a meter may be routed through different nodes in a mesh based AMI network. After scrubbing the data and filtering out duplicates, the messages and outage report database may be organized into a data structure. The data structure associated with the meter messages may relate to many attributes of the meter. For example, an AMI meter may generate over 280 types of event messages.

Once the data has been scrubbed, it may be processed by a data mining engine. In one implementation, the data mining engine may be IBM's SPSS tool (http://www-03.ibm.com/software/products/en/spss-decision-trees). A data mining engine may be implemented as statistical analytical software used for data analysis, data mining and/or forecasting. Use of the data mining engine may enable users to import (from a variety of sources including databases, flat files, IBM Cognos, Excel, XML, etc), manage, and analyze data in a graphical user interface. It may also allow the user to construct graphs and charts, tables, cross-tabulations, build forecasting models, decision-trees, and perform a number of advanced statistical functions and export them to the desired format.

The data mining engine may generate equations describing message behaviors based on any of a number or theories including for example, a natural theory of entropy. These equations or algorithms may then be used to predict outages. In one embodiment, the equations are represented as a visual and textual breakdown of a decision tree. The decision tree is selected based on a comparison of different correlations among meter events and selecting the decision tree which best predicts failures. The decision tree analysis may be used to model a series of events and look at how they affect an outcome by calculating a set of conditional probabilities based on different scenarios.

In one implementation, a CHAID (CHi-squared Automatic Interaction Detection) decision tree may be selected for failure prediction. In another embodiment, a different process may be selected for splitting and pruning a decision tree, and noise handling may be selected, such as C5.1 or other decision tree process known to those skilled in the art. Once one of the models or trees is selected, algorithm logic may be defined and delivered. The algorithms are capable of generating prediction models for predicting single premises outages before they occur based upon messages from smart meters. The final algorithms look for groups of event messages in a hierarchical method. In one implementation, application of the decision trees shows that premises with SNC (interruption type SEC, SVC) have smart meters that send certain types of messages or message behaviors at a rate or occurrence or in certain concentrations 48-24 hours before an outage occurs.

In one implementation, the process may generate a NLS ticket, then upgrade to a SNC upon receiving customer call reporting an outage. In addition to predicting single customer outages, the process can help reduce the number of "bad truck rolls."

Figure 1:
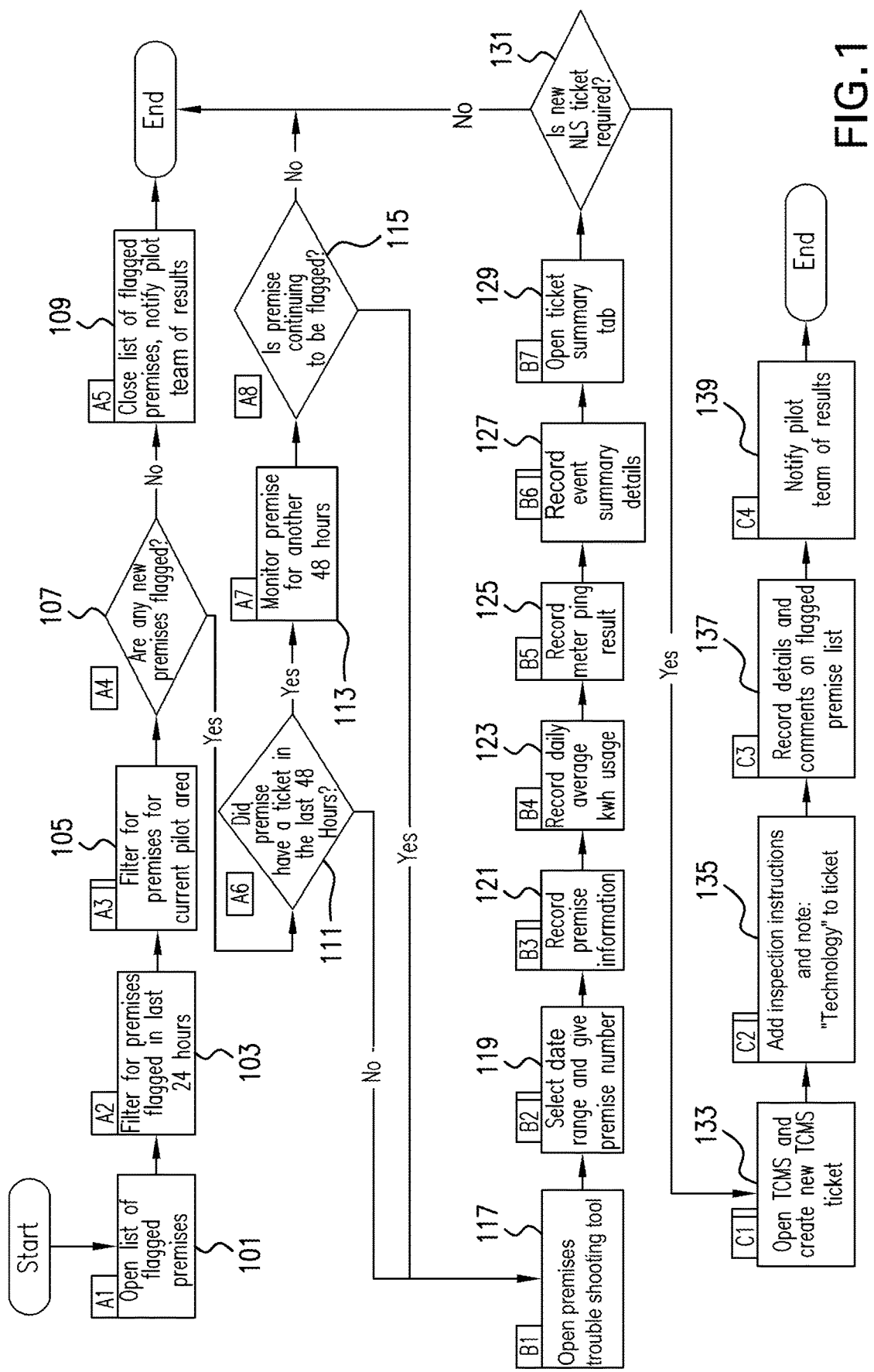
FIG. 1 illustrates one implementation of a method to create a Single premises No Current (SNC) ticket based on a predictive algorithm.
Figure 2:
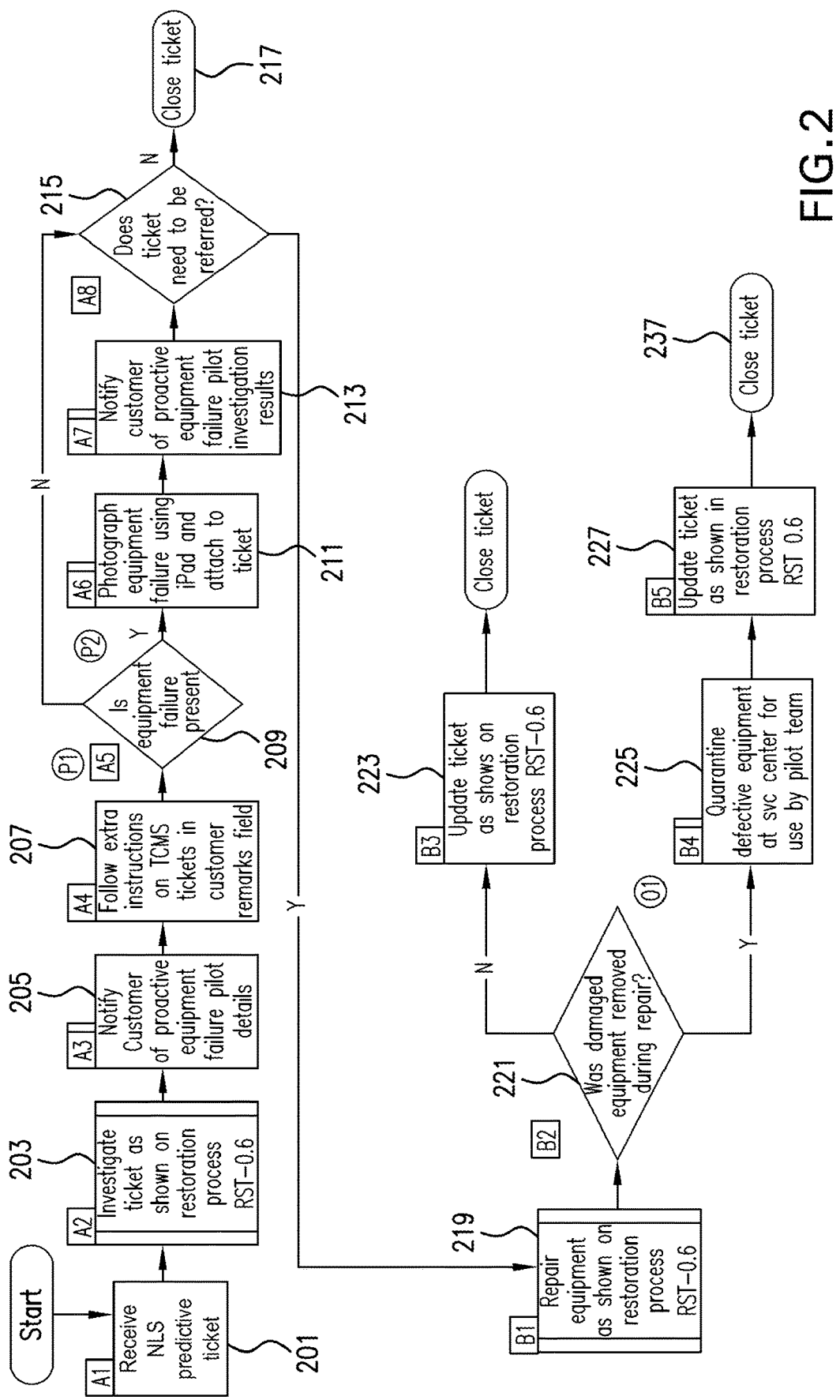
FIG. 2 illustrates one implementation of a method to investigate single no current prediction tickets created through the process illustrated in FIG. 1.

Once message behaviors able to predict deficient elements of the grid have been determined, messages from smart meters may be analyzed to predict outages. FIG. 1 and FIG. 2 describe a use of the message behaviors for implementing corrective actions.

FIG. 1 illustrates one implementation of a method to create a SNC ticket based on a predictive algorithm using smart meter message behavior. In step 101 the process opens a list of flagged premises. The premises may be flagged by an outage predictor which flags premises based on at least an output smart meter messages processed by any of a plurality of decision tree based models. In step 103 the process filters for premises flagged in last 24 hours. In optional step 105 the process filters premises for current area of interest. In step 107 the process determines whether there are any new premises flagged, and if no new premises are flagged, then in step 109 the process closes a list of flagged premises. The process may optionally go on to notify a team, such as an evaluation team, of the results. If new premises are flagged, then in step 111 the process determines whether a premise had a ticket in the last 48 hours. If the premises had a ticket in the last 48 hours, then in step 113 the process monitors the premises for another 48 hours, and then the process in step 115 determines whether the premises is continuing to be flagged, and if the premises does not continue to be flagged, the process ends.

In step 117, the process opens a premises troubleshooting tool (see FIG. 4) after it has been determined that a premises did not have a ticket in an initial period of 48 hours (step 111) or after it has been determined that a premises continues to be flagged after being monitored for an additional 48 hour period following the initial 48 hour period (steps 113 and 115). The premises troubleshooting tool allows selection of a date range and assignment of a premises number in step 119. Step 121 records premises information; step 123 records daily average kwh usage; step 125 records meter ping result (e.g., ping for instantaneous voltage data); step 127 records event summary details; and step 129 opens a ticket summary tab.

In step 131 the process determines if a new NLS ticket is required, and if no new NLS ticket is required the process ends. If a new NLS ticket is required, then the process, in step 133, opens TCMS and creates a new trouble call management system ("TCMS") ticket including the NLS ticket. In step 135 the process adds inspection instructions and note "Technology" to ticket thereby indicating that the ticket is created by the utility predictive model and not a conventional customer outage report. In step 137 the process records details and comments on the flagged premises list. In optional step 139 the process notifies a team, such as the pilot team, of the results.

FIG. 2 illustrates one implementation of a method to investigate single no current prediction tickets created through the process illustrated in FIG. 1. In step 201 the process receives an NLS prediction ticket generated in FIG. 1. In step 203 the process investigates the ticket as shown on the restoration process for restoring power (which is part of a standard repository of business processes: RST—0.6). In optional step 205, the process generates a signal for notifying the customer of proactive equipment failure evaluation details. In step 207 the ticket is sent to a repair crew with instructions to follow for the repair. The ticket includes extra instructions from the trouble call management system ("TCMS"). The extra instructions may be included in the customer remarks field. The TCMS extra instructions may be used to enhance the management of outages or identification of potentially defective grid elements. For example, a TCMS ticket may be sent to a crew with specific steps that let crew know what to do in the event of intermittent power problems such as conduct additional due diligence, follow through extra steps and document in the system. In step 209 the process determines whether there is a deficient grid element resulting in equipment failure present based upon the finding or investigation of the crew. If there is no equipment failure the process determines whether the ticket needs to be referred for equipment repair (step 215). If the ticket does not need to be referred, the ticket is closed (step 217). If there is equipment failure (step 209), then as part of the process of the investigation of the crew, a photograph may be taken (step 211) of the equipment failure, and is attached to the ticket, and in optional step 213 the customer of a proactive equipment failure investigation result is notified.

If a ticket indicating a deficient grid element needs to be referred for repair (step 215), then in step 219 the deficient grid element equipment is repaired. The equipment may be repaired in accordance with a standard business process which may be described for example in restoration process RST-0.6. In step 221 the process determines whether the damaged equipment was removed during repair. If the damaged equipment was not removed, then the process in step 223 updates the ticket as shown on restoration process RST—0.6 and the ticket is closed. If the damaged equipment was removed, then in step 225 the process quarantines defective equipment. The quarantined equipment may be used by an evaluation team to further enhance the failure prediction model. For example, damaged cables may be removed and held on to so that the utility can see the damage and add the results to the prediction model generator. The process updates (step 227) the ticket as shown in restoration process RST 0.6, and the ticket is then closed (step 237).

Figure 3:
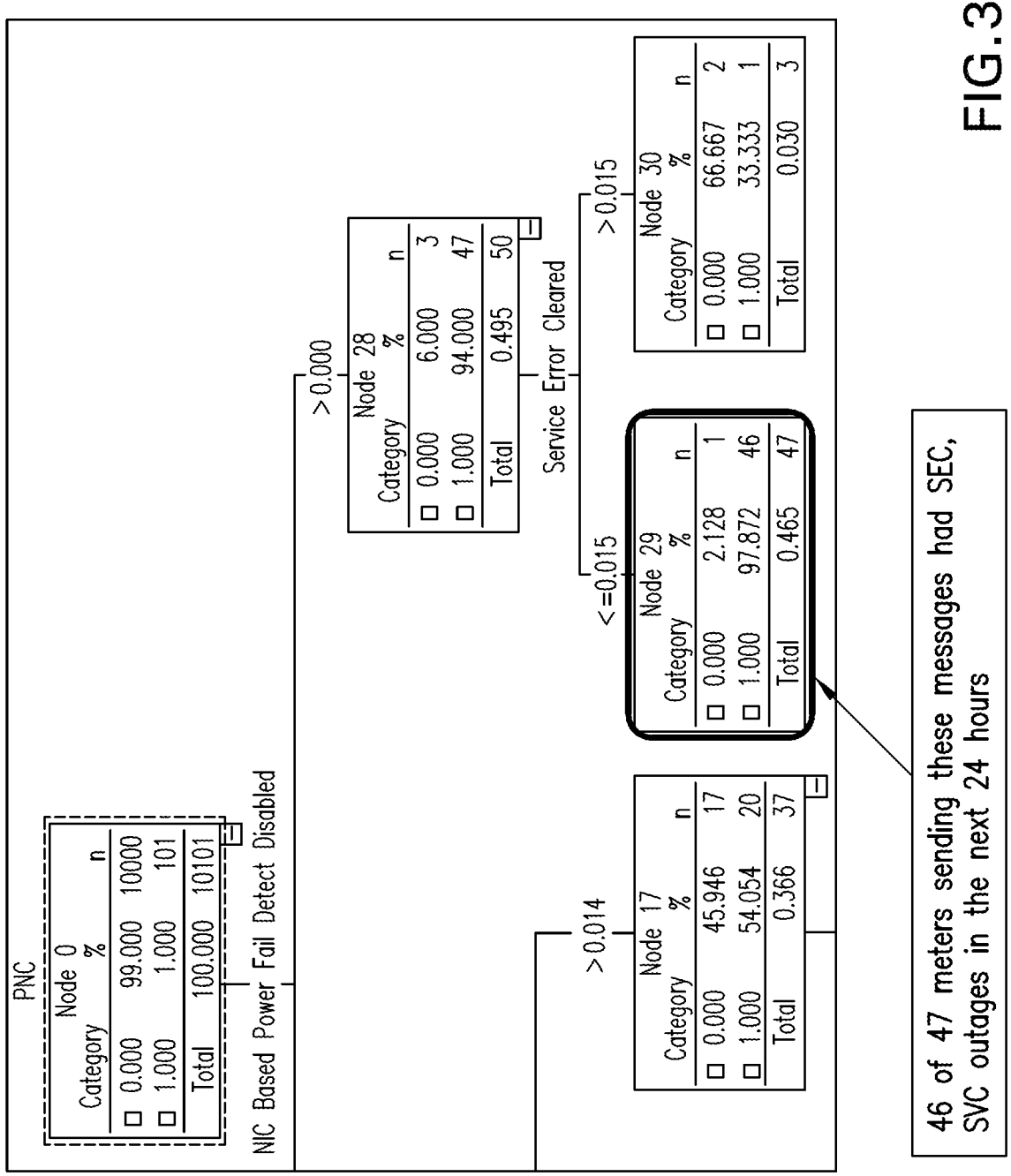
FIG. 3 illustrates the monitoring of AMI smart meter messages to ascertain the likelihood of an SNC outage in accordance with one implementation.

FIG. 3 illustrates a decision tree based model for the monitoring of AMI smart meter messages to ascertain the likelihood of an SNC outage in accordance with one implementation. It has been discovered that premises with SNC outages exhibit a message behavior that results in the smart meter sending certain types of messages in certain concentrations 24-48 hours before the SNC outage. In the illustrated embodiment, if (as shown by Node 0) a premises sent one or more "NIC Based Power Fail Detect Disabled" (NIC or Network Interface Card may be defined as the computer chip in the smart meters that enable messaging and communications) and (as shown by Node 28 and Node 29) less than 1.5% of its total messages sent were "Service Error Cleared" (which is a type of AMI event indicating that there was an issue detected by the meter but that it has cleared itself), then using the predictive algorithm the process determines that there is more than 95% chance that the premises associated with the smart meter will have an SNC interruption in the next 24 hours. Accordingly, the premises will be flagged and processed in accordance with the process of FIG. 1.

Figure 4:
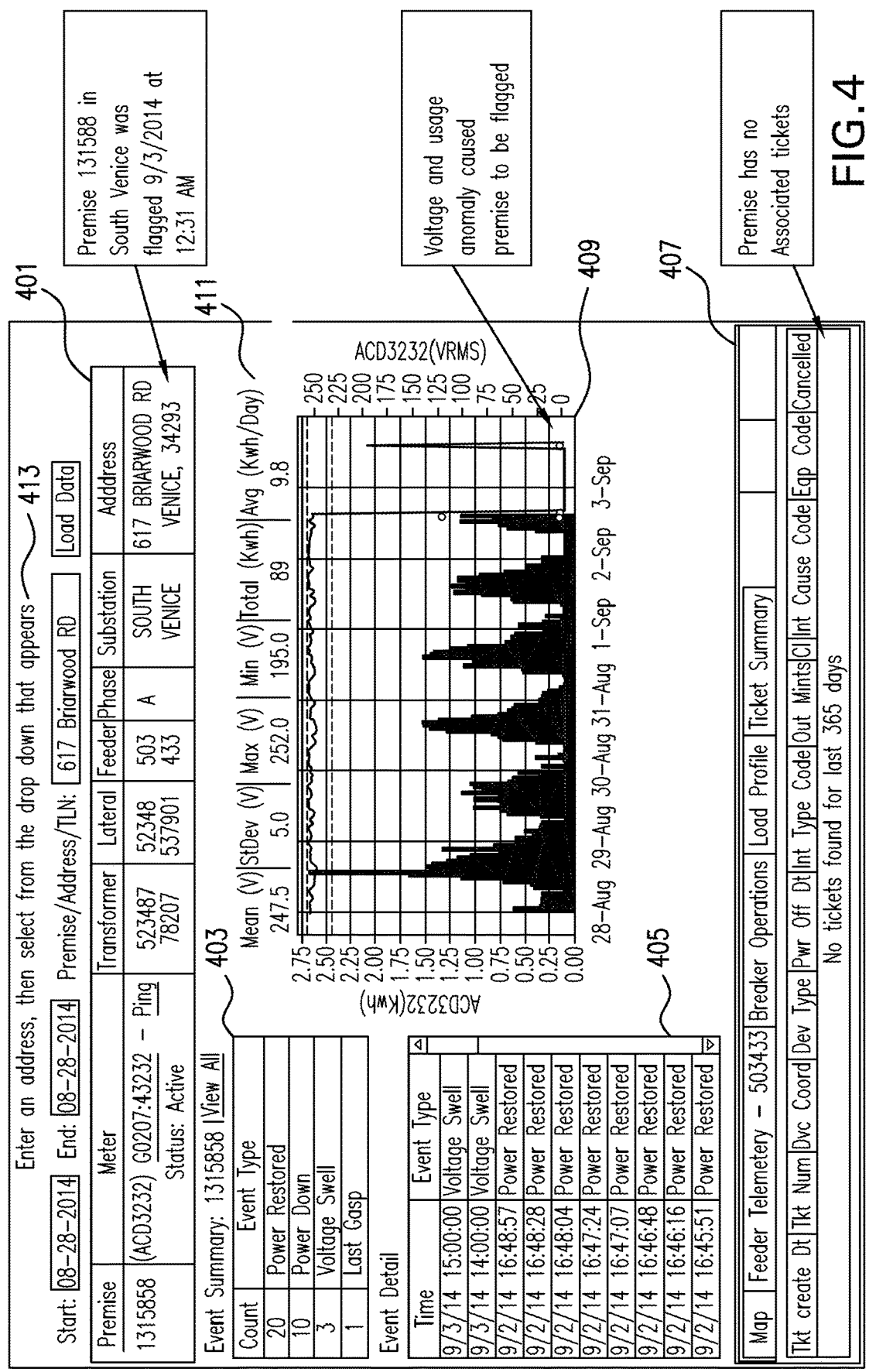
FIG. 4 illustrates a graphical user interface for the premises troubleshooting tool in accordance with one implementation.

FIG. 4 illustrates a graphical user interface ("GUI") produced by the premises troubleshooting tool in accordance with one implementation. This tool may be used for investigating a flagged premise. The GUI 413 prompts the user for premises information, which is then uploaded into the tool. The GUI displays detailed premises information 401 for a premise that has been flagged by the process of the present disclosure, Event Summary information 403, detailed Event information 405, and ticket information 407. The GUI also displays a graph plotting data corresponding to power usage in kWh and corresponding to measured voltage in volts root mean square (Vrms). In the illustrated exemplary implementation, a voltage and usage anomaly 409 caused the premises to be flagged. The anomaly shows the voltage and power dropping to zero after September 2. The GUI also displays summary voltage and usage information 411.

Figure 5:
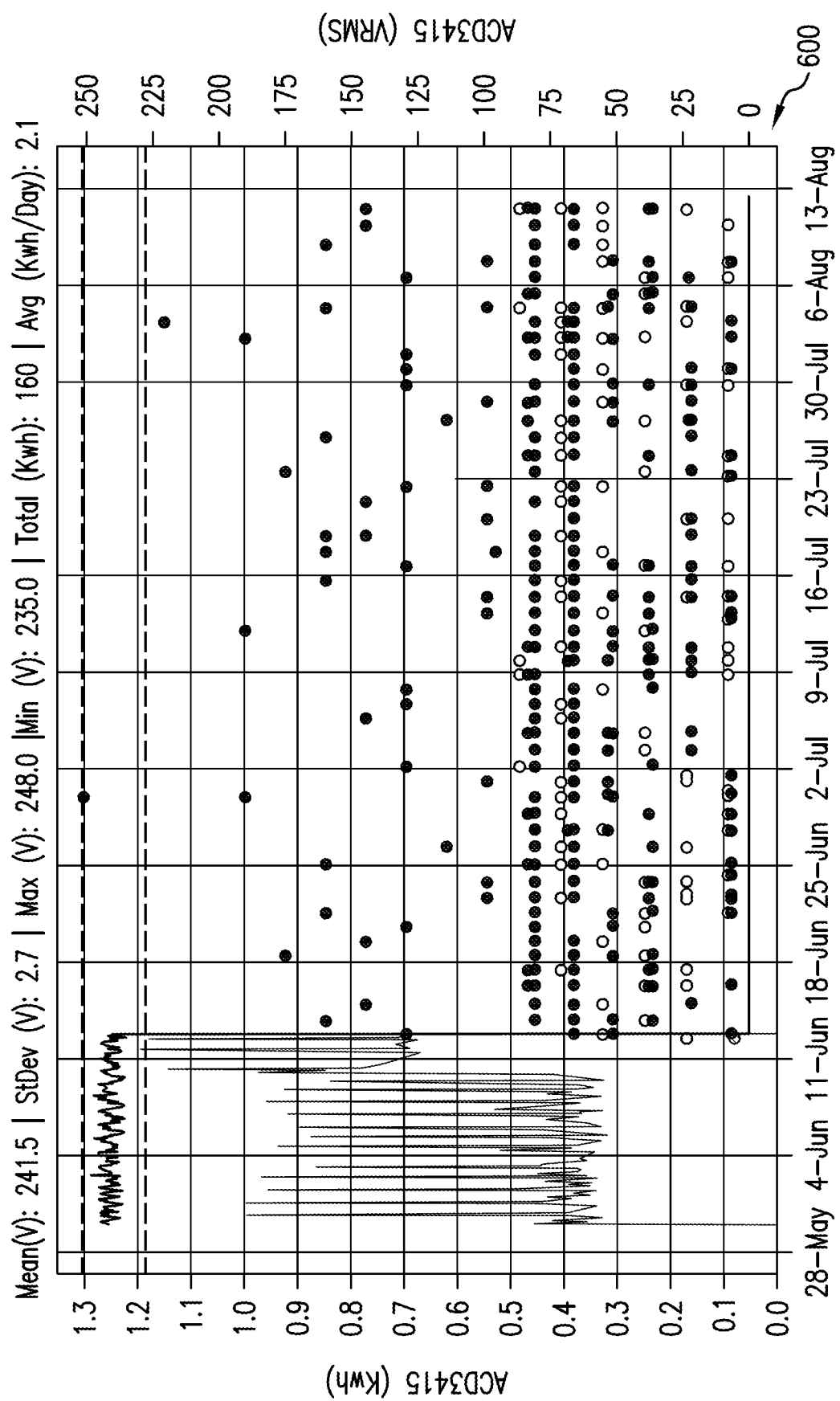
FIG. 5 illustrates a chart showing last gasp messages observed in order to ascertain whether a true sustained power outage has taken place in accordance with one implementation.

FIG. 5 illustrates a chart 600 showing last gasp messages which do not represent a true sustained outage. In one implementation, a last gasp message may be defined as an event generated when an AMI meter detects a zero voltage event for a period of time (e.g., 45 seconds). The voltage and power at a premise are shown dropping to zero after June 11. After the drop numerous smart meter messages including last gasp messages are generated as represented by dots occurring after June 11. While focusing on the valuable messaging from the AMI network chatter may yield important information about outages, because the amount of last gasp messages illustrated in FIG. 5 does not represent a true sustained outage, the last gasp messages alone are not entirely accurate for generating reliable single premises tickets.

Figure 6:
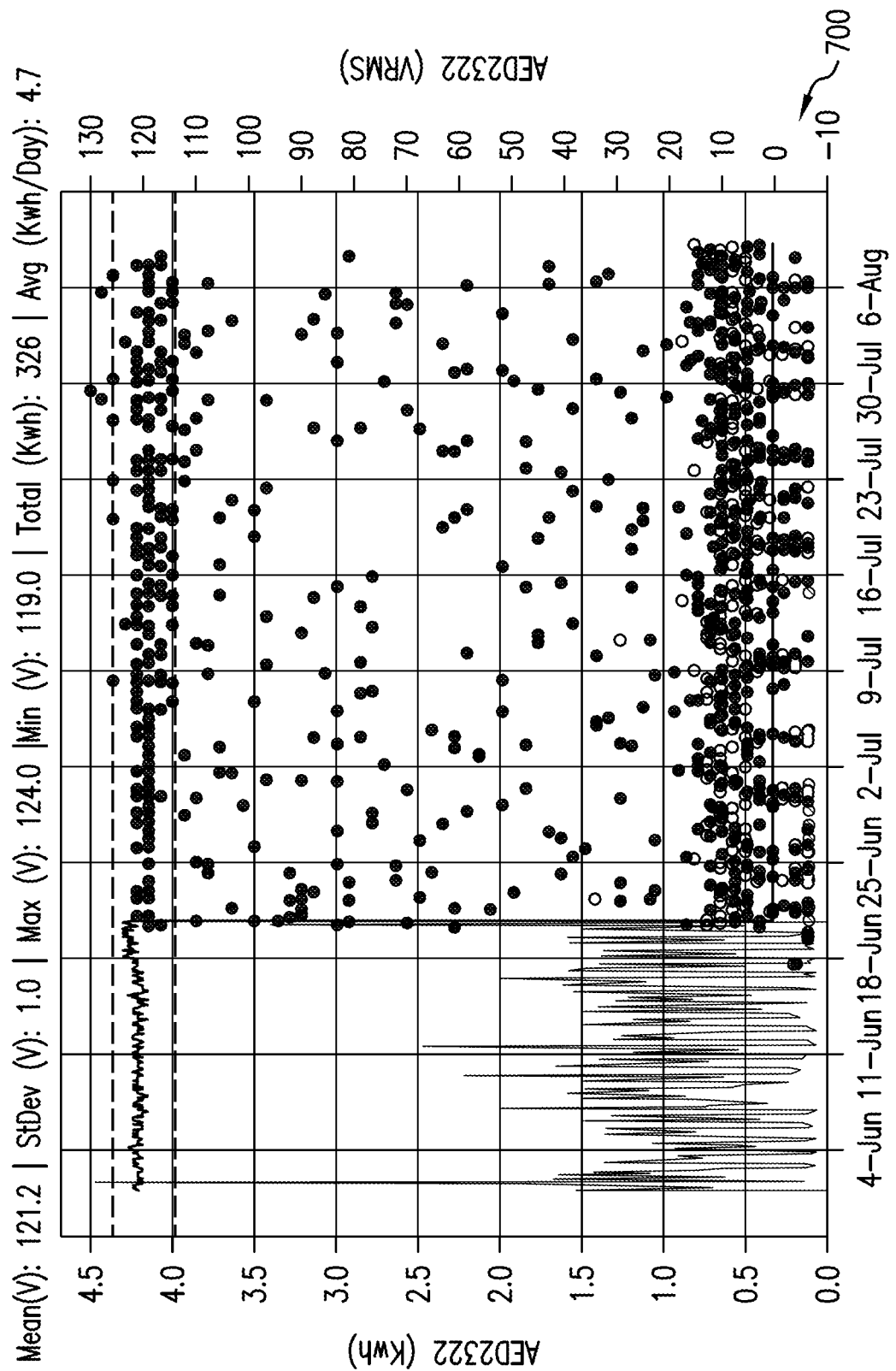
FIG. 6 illustrates a chart that reflects intermittent power conditions in accordance with one implementation.

FIG. 6 illustrates a chart 700 that reflects intermittent power conditions. In one embodiment, the processes for predicting power failure exploit smart meter message patterns with intermittent or partial power problems.

Figure 7:
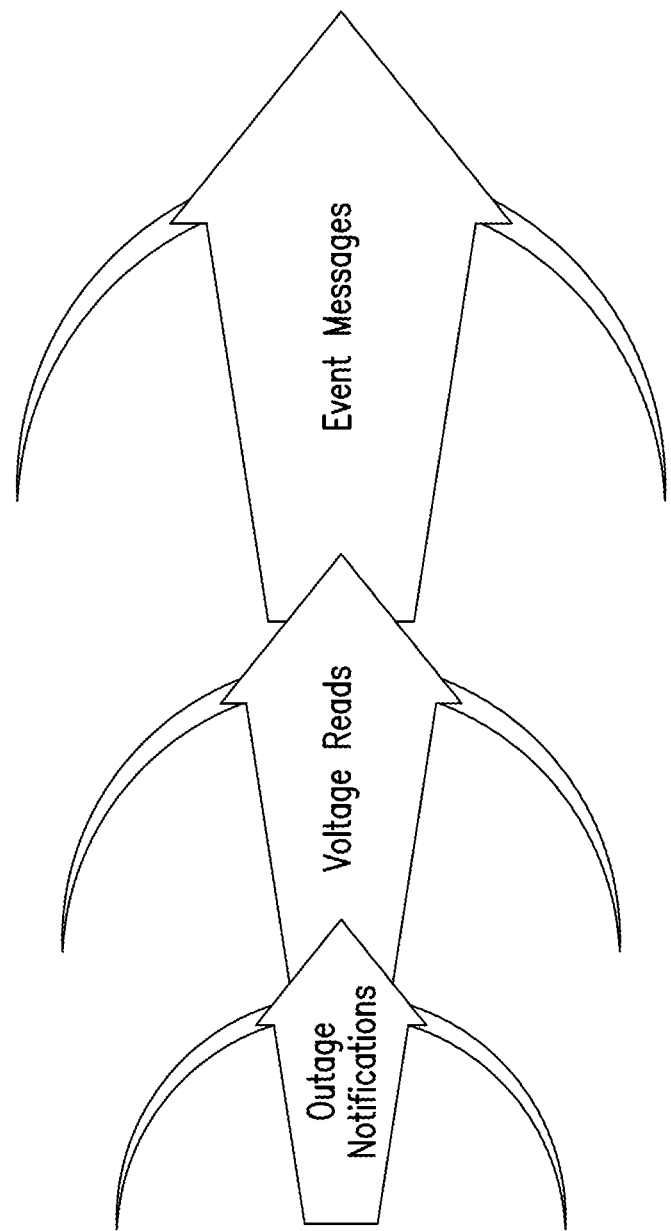
FIG. 7 illustrates at a high level the flow of information from a smart meter in accordance with one implementation.

FIG. 7 illustrates at a high level the flow of information (notifications, voltage reads, event messages, etc.) from a meter. In addition to outage notifications generated by a smart meter, each smart meter generates a significant number of voltage read messages and significantly more event messages. In an example power distribution system having six hundred thousand smarter meters, over one point two million event messages across over two hundred and eighty categories or message types (none of which may specify a deficient grid element) may be generated in a twenty four hour period while only sixty single premises outages may occur within the period. Thus processing one point two million messages per day to predict sixty outages before a customer generate outage report occurs may be akin to finding a preverbal needle in a haystack. Furthermore, a typical utility may have very many more smart meters in the power distribution system, over four million smart meters for example. The resulting very large amount of data may be stored in a database. The database may be a database adapted for storing big data files in a big database. Such a database may be an extensible relational database platform using a massively parallel processing approach such as a Greenplum database, as is known to those familiar with the art. Historical data may be housed in the database and then analyzed using data mining techniques in accordance with the present disclosure. These notifications, reads, and event messages may include last gasp messages, power failure count messages, NIC power down messages, inversion count notifications, zero voltage messages, DC detection cleared messages, and other types of messages as would be recognized by those skilled in the art.

Figure 8:
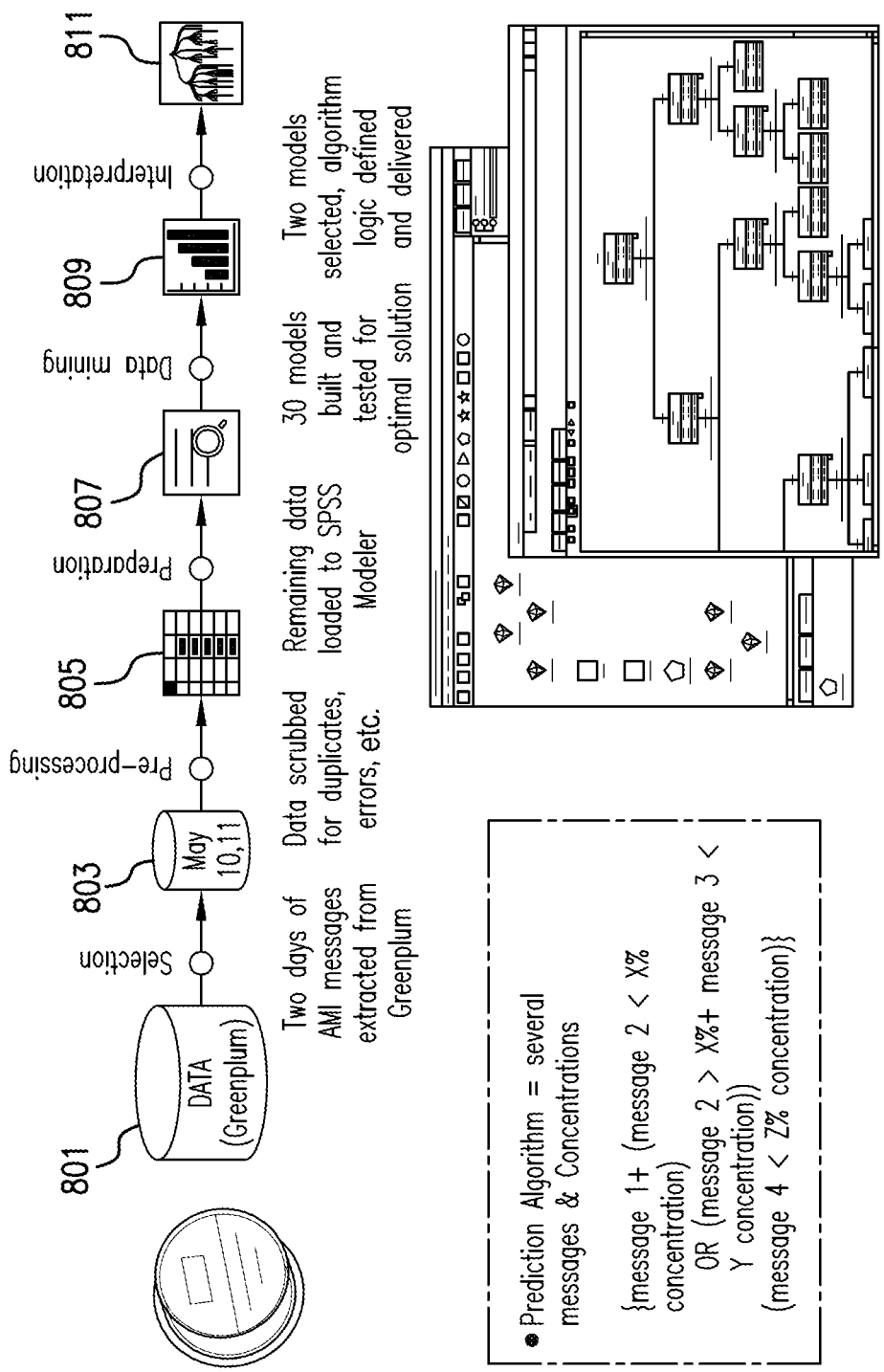
FIG. 8 illustrates a methodology for selecting power failure prediction models in accordance with one implementation.

FIG. 8 illustrates a methodology for generating power failure prediction models in accordance with one implementation of the disclosure. Numeral 801 represents the database that contains meter event data. Numeral 805 represents a step of scrubbing meter event data 803 collected over a two day period. The data is scrubbed for duplicates, errors, etc. Once the data is pre-processed, it is loaded to a data mining engine 807. The data mining engine considers meter event message information as well as customer generated power outage information. As a result of the data mining, different models may be created 809 for the prediction of power failures. In accordance with one implementation, two decision tree models, such as CHAID and C5.1 are selected such that event data can be fed into the algorithms and power outages can be predicted before being reported by a customer. These algorithms may be represented by decision trees that take into account several types of messages and their concentration. The Prediction Algorithm rectangle of FIG. 8 shows an example of an algorithm indicative of a message behavior based upon a branch of a decision tree model, e.g., {message 1+(message 2<X % concentration) OR (message 2>X %+message 3<Y concentration)) (message 4<Z % concentration)}.

Figure 9:
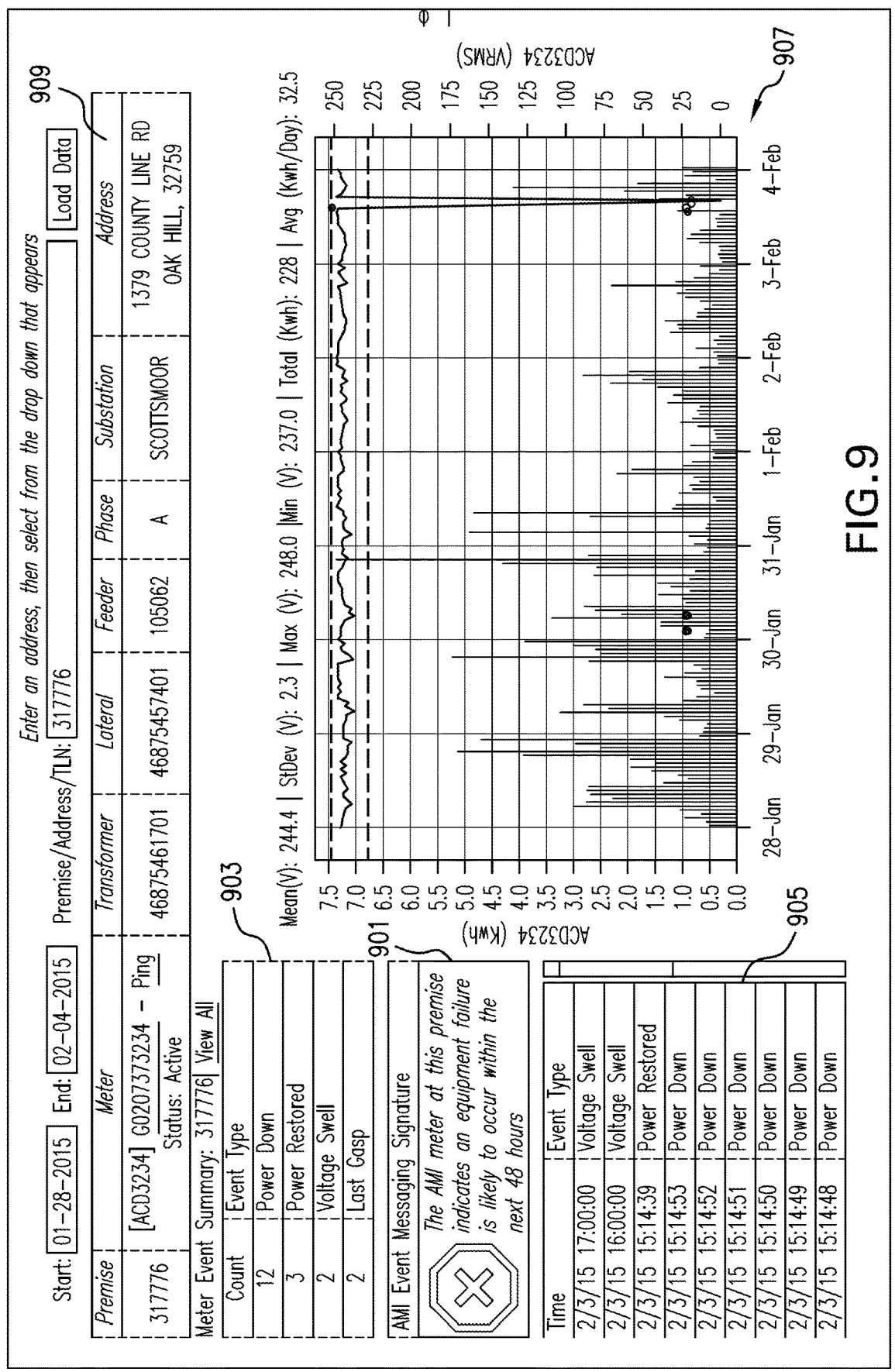
FIG. 9 illustrates a user interface that may be used to display notifications alerting a utility that a power failure is likely to occur in accordance with one implementation.

FIG. 9 illustrates a user interface that may be used to display notifications 901 alerting the utility of a prediction that a power failure is likely to occur at a suspect premises. The user interface may display premises information 909, voltage readings 907, meter event summary 903, and a history of events 905. The aforementioned decision trees are applied to the event data in order to ascertain whether to display an alert 901. The information displayed in FIG. 9 including notification 901 may allow a ticket generator to generate a ticket enabling a repair crew to repair a deficient grid element associated with the suspect premises. Given the predictive nature of the notification the repair may occur prior to a failure of a defective grid element, or prior to a generation of an outage report.

Figure 10:
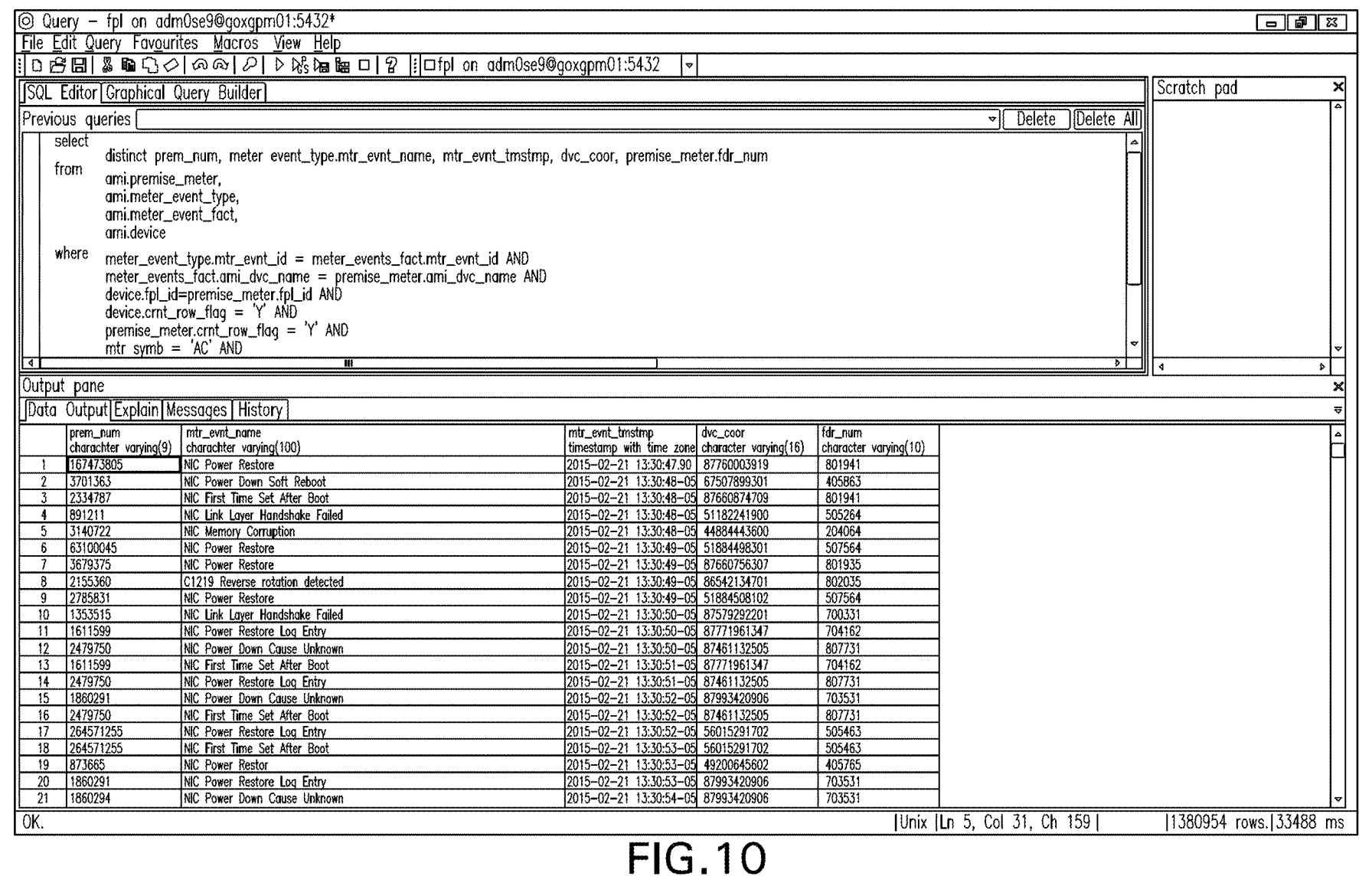

FIGS. 10-15 describe more specific implementations for predicting equipment failure in an AMI network. FIG. 10 illustrates an exemplary set of event messages retrieved from an AMI database (e.g., a GreenPlum database). In one implementation, event messages from a time period may be selected for extraction. Altogether, more than 100 million event messages may be extracted and saved in a CSV file. In the exemplary extraction process illustrated at least partially in the SQL Editor window of FIG. 10, PostGreSQL is one of the possible tools known to those familiar with the art that may be used to access a GreenPlum database.

Although only a partial list of messages is shown in FIG. 10, the following AMI meter event data or information may be extracted from GreenPlum:
Premises Number
Event Name
Event Timestamp
Transformer Number
Feeder Number
Substation Name
Device Phase
Meter Serial Number
Meter Name (as listed in the database)

In addition to event messages, voltage readings of zero (0V) may be classified as notable events and so recorded. With the messages extracted, a complex data cleanup may then be started. The data cleanup may include defining and removing duplicate messages and messages from commercial industrial meters or other meters not associated with a single premise. A duplicate message may be defined as any message which has been sent more than once from the same meter within a time period, such as one second. When the data scrubbing is completed, only discrete events from residential meters remain in accordance with one implementation.

After the event data extracted is ready for analysis, the process may query all single premises trouble or outage tickets from an outage processor which may be included in a Power Delivery Distribution data warehouse. Premises which experienced an outage during the time frame of interest may be noted, and a column added from the outage processor to the corresponding data record to indicate whether an event message was sent by a meter before (which may be defined as any event which occurred more than 6 hours before the meter was interrupted), during (which may be defined as any event from 6 hours before the meter was interrupted until power to the meter was restored), or after (which may be defined as any event which occurred after power was restored to the meter) an outage event.

FIG. 11 illustrates a combination of ticket and interruption types that may be analyzed in one implementation. FIG. 11 shows eight columns with corresponding ticket types and seven rows with corresponding interruption types as analyzed by a repair crew in response to a ticket. In one implementation, tickets which started as a single premises interruption (single no current—SNC/single no current underground—SNCU) and ended as a secondary (SEC) or service (SV) interruption (e.g., service indication of intermittent problems) are considered as part of the algorithm development for predicting failures. A person familiar with the art would recognize that other types of tickets may be considered.

At this point, a time series analysis or study may be undertaken of the data set resulting from the selection of FIG. 11. In one implementation, all event messages for meters which experienced an outage may be listed from oldest to newest in order to facilitate review of when the messages were sent. In one implementation, the time series analysis reveals that most event messages occur in a time period preceding an outage.

Figure 12:
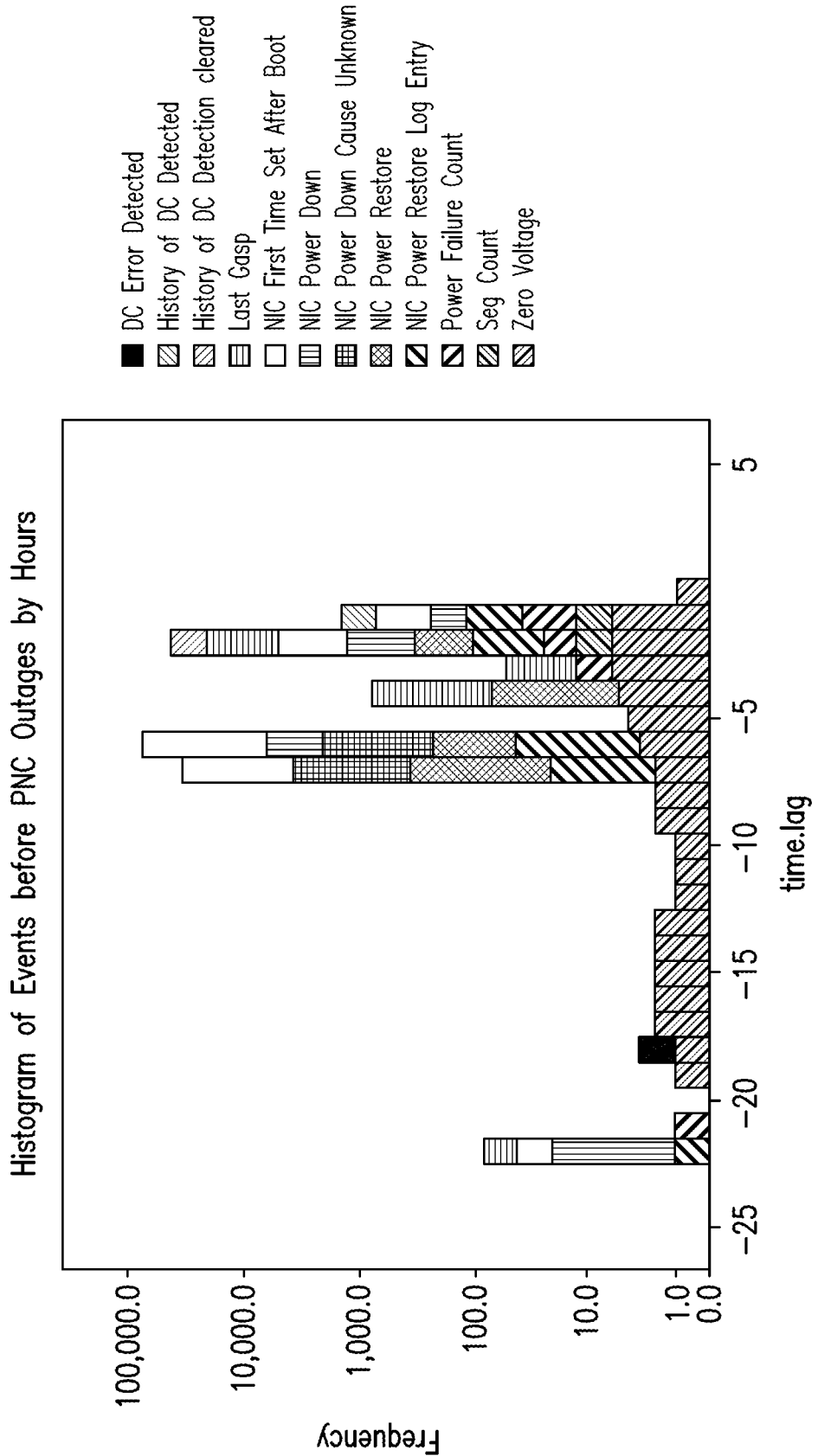
FIG. 12 illustrates an exemplary histogram or time series plot of AMI event messages in accordance with one implementation.

FIG. 12 illustrates an exemplary corresponding histogram or time series plot of AMI event messages. The histogram of FIG. 12 shows a frequency of twelve event or message types occurring between twenty five hours before and five hours after an outage. In this example, the frequency of events increases significantly before an outage. In one implementation, messages occurring within a period ranging from 54 hours before to 6 hours before an outage may be evaluated. The difference between the raw count of events in that 48 hour period may be compared to a corresponding 30 day historical average. In one implementation all AMI events stored in the GreenPlum database and occurring outside of any chosen time frame may be considered as irrelevant for purposes of creating a model for failure prediction.

In another example, a routine extract may be set up to query the total number of events occurring in the last 24 to 48 hours for comparison against a long term historical average. In one embodiment, the query may be run under the assumption that it will be 50% successful, meaning that 50% of meters which sent an above average (>2x) rate of event messages are likely to experience an outage.

With the meter events coded, the data may be imported into the data mining engine (for example, IBM's SPSS modeler software). Once inputted into the data mining engine, the data may be transformed such that the event message concentration for each AMI smart meter is calculated. The calculation is shown in equation 1.

Equation 1: Calculating the Concentration of Meter Messages

Concentration of Message $A$=(# of Message $A$ 54 hrs to 6 hrs before interruption)/(All Messages 54 hrs. to 6 hrs. before interruption)

As an example, suppose meter #1 outputted 100 total messages between 54 hours before to 6 hours before an interruption occurred. If meter #1 had 15 'NIC Power Down' event messages in that time period, the concentration of 'NIC Power Down' messages is calculated to be 15%. This calculation may be repeated for all residential and all meter event types.

Example 1: Calculating the Concentration of 'Nic Power Down' Messages for Sample Meter #1

15%=15 NIC Power Down/100 Total Messages

In this example, the message behavior includes a ratio of first messages (15 NIC Power Down messages) over second messages (100 Total Messages), the first messages including a first message type and the second messages including the first message type and at least a second message type, the ratio being 15% which is greater than zero and less than one. Also, it was determined that only 82 events were consistent with electrical messaging, and so the Greenplum AMI event data set was reduced to calculate the message concentrations for these event types.

A sample of the data prepared for input into the data mining engine is illustrated in FIG. 13. With the raw data input into the data mining engine, an auto-classifier function may be applied to the data, which can be used to determine which models perform the best prediction of a targeted condition. In this example, column A shows the target condition to be an interruption or outage. Column B shows the premises number (in scientific notation) and the remaining columns show twelve of the eighty two event types consistent with electrical messaging and relevant to the outage. Each of the cells associated with the eighty two event types shows a percentage of the concentration of events (shown as a whole number). In one implementation, based on the filtering parameters applied to the data before inputting the data into the data mining engine, prediction models may be selected. In one implementation, when data imbalance exists, either a CHAID (Chi Squared Automatic Interaction Detection) or a C5.1 model may be selected for application to real-time data being received from the meters and predict power failures. In one implementation, the models may be selected based on the analysis of 100 failures in the data set and more than 4.6 million meters without a failure condition.

In one implementation, to ensure modeling is repeatable before selection of the model, 30 or more replicate models may be created and analyzed which may be generated from C5.1, Log Regression, CHAID or other modeling algorithms. In one implementation, the output from the data mining engine may be a decision tree, so, in the example implementation described 30, decision trees from two separate modeling algorithms (C5.1 and CHAID) may be compared for consistency.

In one implementation, six message concentration types may be considered in order to predict power failures:
  Network Interface Card Based Power Fail Detect Disabled
  History of Direct Current Detected <0.1% concentration
  History of Direct Current Detected >0.1% concentration
  Network Interface Card Power Down <12.5% concentration
  Service Error Cleared <1.5% concentration
  Zero Voltage Reads It should be noted that these six message types do not specify any weather information and thus the predictions have the potential advantage of being independent of any weather conditions associated with the power distribution system. An algorithm condition may be set as follows:

Equation 2: Predictive Algorithm Event Message Concentration

{NIC Based Power Fail Detect Disabled+(History of Direct Current Detected <0.1% concentration+) OR (History of Direct Current Detected>0.1%+ NIC Power Down<12.5% concentration))(Service Error Cleared<1.5% concentration)}

Figure 14:
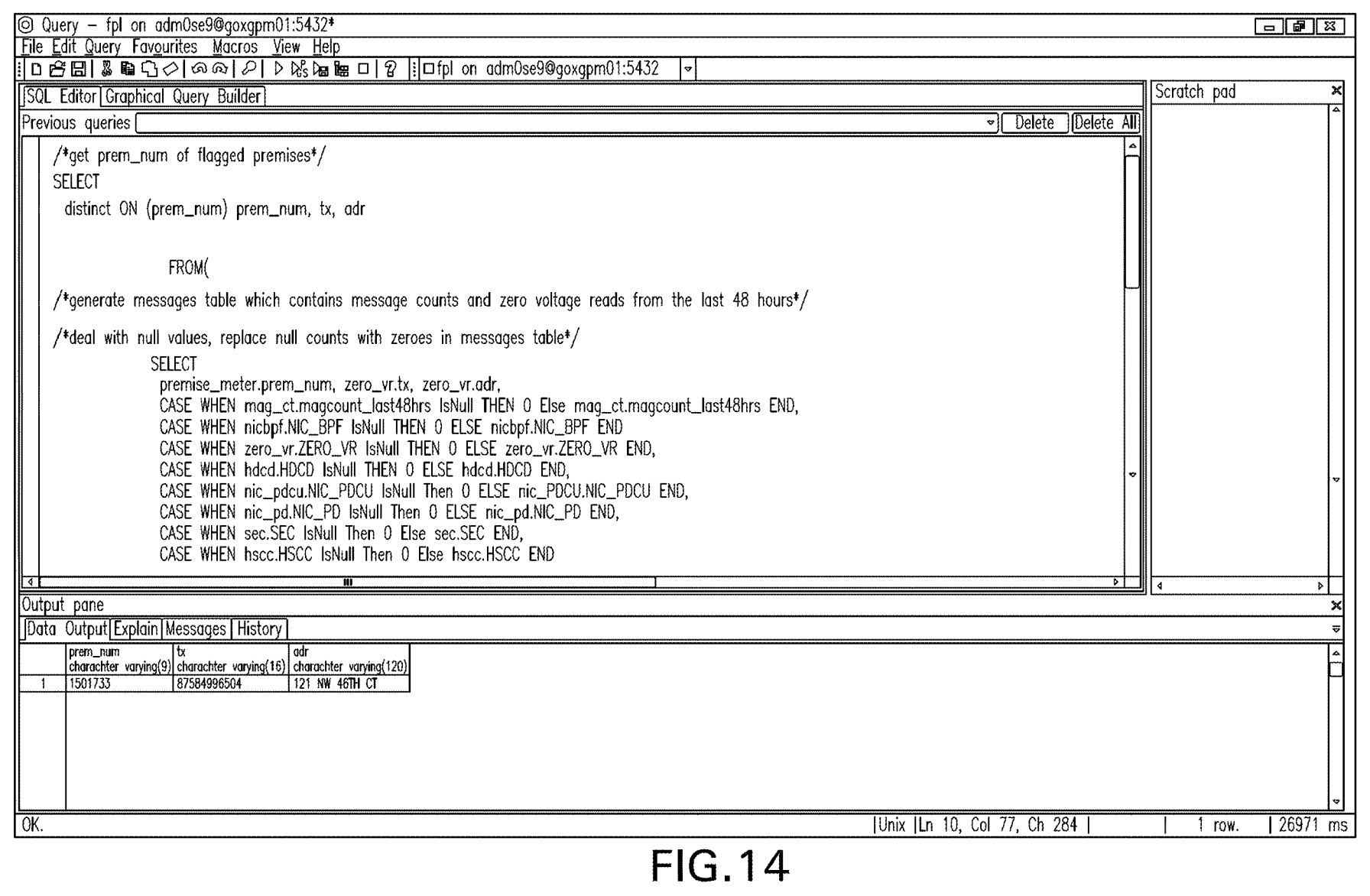

A set of SQL queries may be applied so that an automatic data extract of premises meeting the algorithm conditions is executed at 15 minute intervals, in accordance with one embodiment. A sample screenshot of the extraction process is shown in FIG. 14. The results of these queries may be stored in a SQL database where they can be retrieved on demand or according to a script.

Figure 15A:
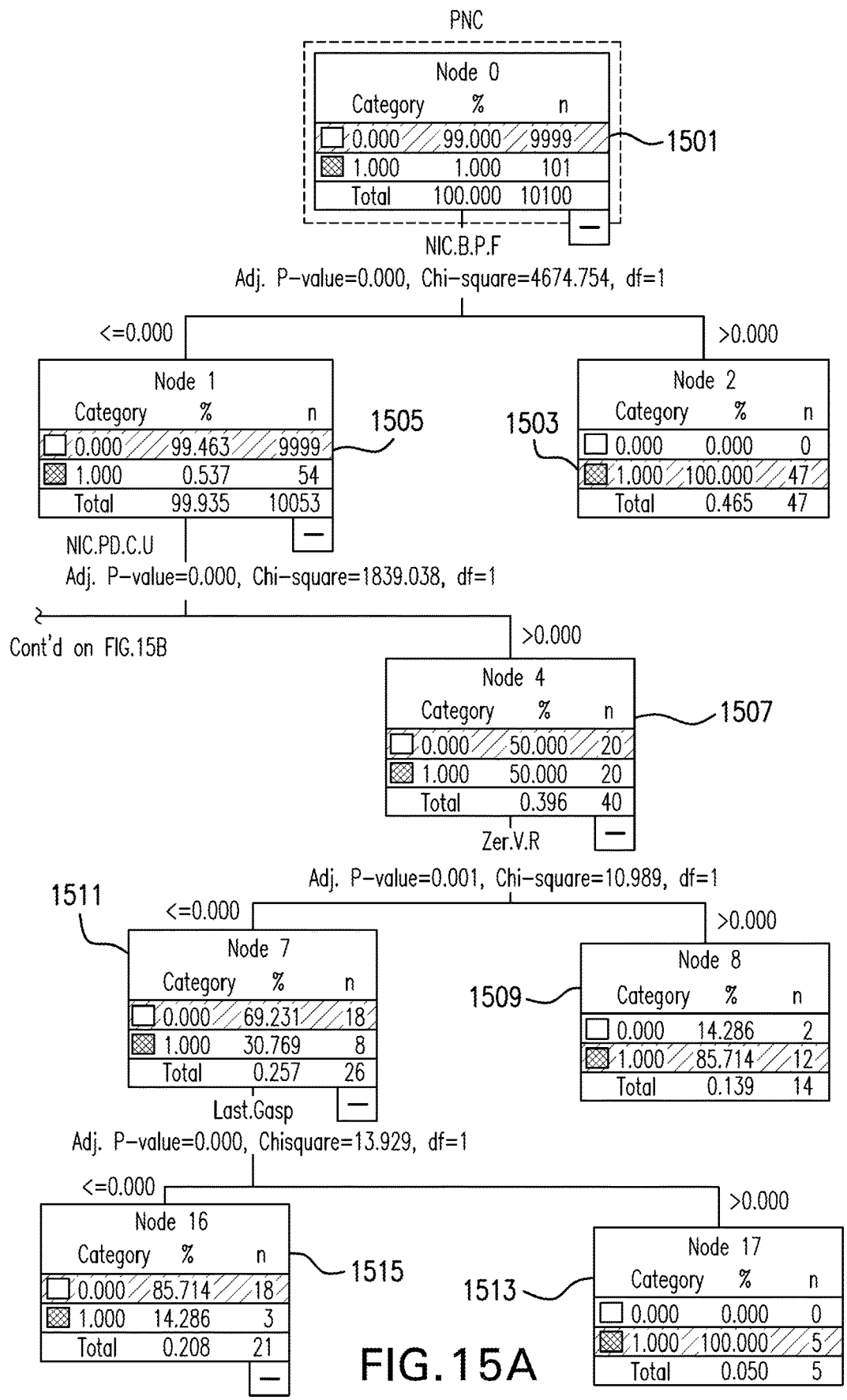
Figure 15B:
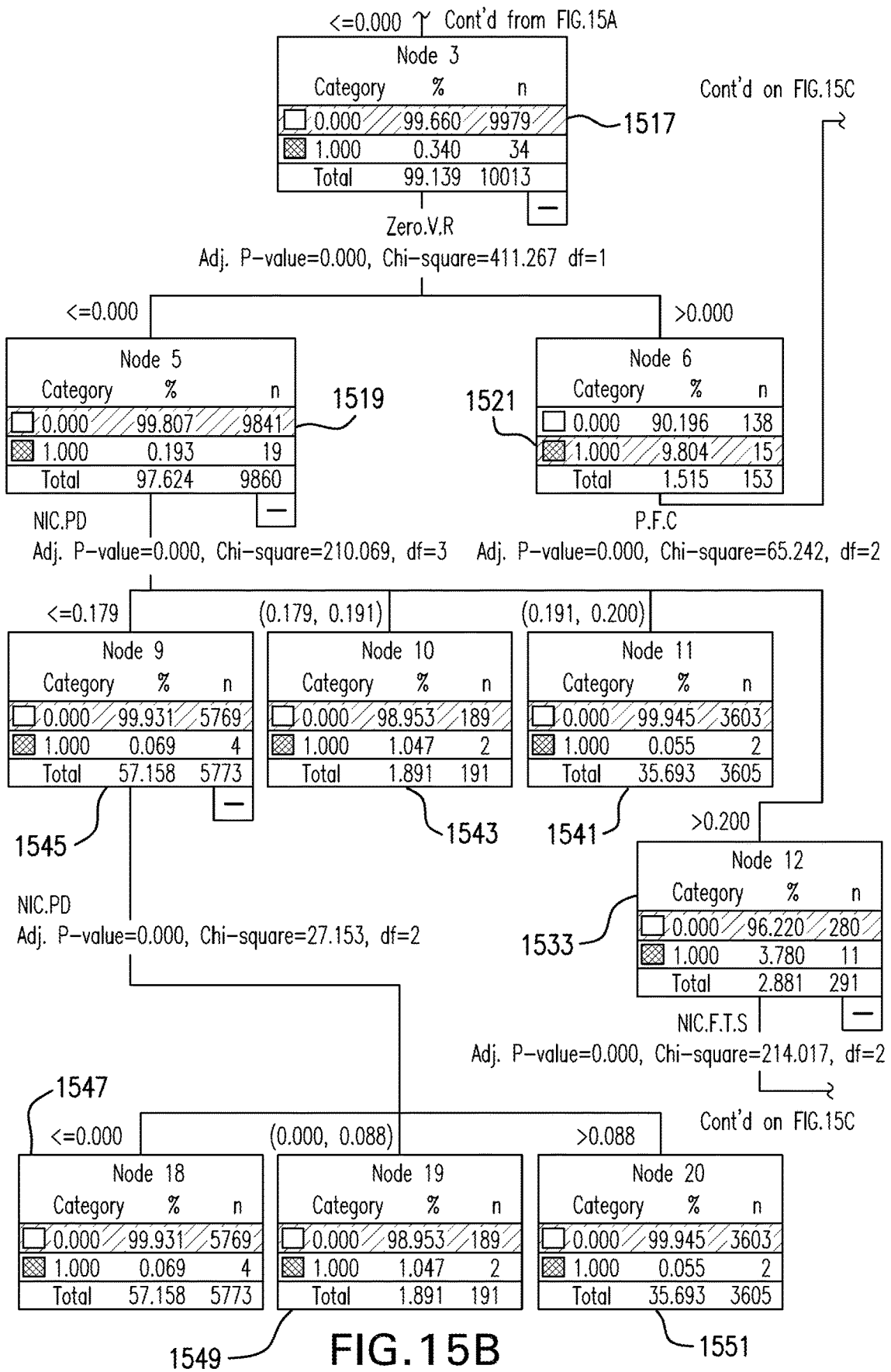

FIG. 15A-FIG. 15C illustrates a decision tree that may be used to predict power failures. In the illustrated implementation, the tree includes tree nodes (as opposed to network nodes) 1501 to 1551. Each node may be associated with a type of event message that is considered to be relevant. The higher the messages appear in the tree structure, the more relevant the message will be in connection with predicting a failure. In the illustrated implementation, the predicted outage or failure is associated with a failure that will result in the generation of a PNC ticket. The following event messages are illustrated: NIC B.P.F., NIC P.D.C.U., Zero V.R., Last Gap, P.F.C., NIC P.D., and NIC F.T.S.

In the nodes illustrated in FIGS. 15A-C, each node may include a node identification number (for example "Node 1"); a category (for example, "1" means a failure and "0" a no failure); a percentage of confidence level; and the number of premises "n" that had a particular event. Further, the p-value is the measurement of statistical significant level, the chi-square value represents calculated statistics based on chi-square equation, and the "df" is the degree of freedom—the number of values in the final calculation of a statistic that are free to vary.

An exemplary "split" is described with respect to nodes 1501 to 1505. The number of premises or locations associated with node 1501 is 10,100 (9999 plus 101). Out of that total number of premises, 47 are identified in node 1503 as having sent a NIC B.P.F. event message (indicated by the >0.000 notation). Node 1503 further indicates that all 47 premises that sent an NIC B.P.F. message are associated with a "failure" category 1, since the percentage in node 1503 is 100% in connection with the number n=47. What this means is that in relation to the illustrated implementation, the confidence level is 100%—a customer call was generated in connection with all of the 47 premises to report an outage. Therefore, the system of the present disclosure can be used to predict failures before they occur by processing the additional smart meter messages the model of node 1503 to predict a likelihood of an outage at a suspect premise.

One of the features of the system disclosed herein is that the confidence level threshold can be set to be high, for example, 75% or more, in order to achieve a desired predictability level. For example, in the illustrated implementation, nodes 1503, 1509, 1513, 1523, and 1535 include a confidence level of over 75% in connection with category "1" failure events. These nodes are selected from the multiplicity of end nodes of FIG. 15 (which produce a corresponding multiplicity of prediction models) thus produce selected message behaviors (from a plurality of prediction models 1503, 1509, 1513, 1523, and 1535 selected from the multiplicity of prediction models) for predicting outages (note the message behaviors do not include information specifying any deficient grid element). If the models predict more outages than the repair crew can handle, then the confidence level can be increased and the models re-selected or the results further filtered to match the repair crew capacity. If the models predict fewer outages than the repair crew can handle, then the confidence level can be decreased and the models re-selected or the results less filtered to match the available capacity of the repair crew. For example, the confidence level can be decreased prior to weekend days, seasonal vacation periods or other times when the repair crew has less capacity for repairs so that required repairs may be minimized during those periods when the repair crew has less capacity.

Referring to node 1509, the decision tree shows that out of the total 10100 locations or premises analyzed, the 12 premises that generated both NIC.PD.C.U and Zero V.R. event messages have a probability of 85.714% with respect to reporting a failure. Referring to node 1513, the decision tree shows that out of the total 10100 locations or premises analyzed, the 5 premises that generated both NIC.PD.C.U and Last Gasp event messages have a probability of 100% with respect to reporting a failure. Referring to node 1523, the decision tree shows that out of the total 10100 locations or premises analyzed, the 5 premises that generated both Zero V.R. and P.F.C. event messages have a probability of 100% with respect to reporting a failure. Referring to node 1535, the decision tree shows that out of the total 10100 locations or premises analyzed, the 9 premises that generated NIC.PD event messages at a concentration greater than 0.2% have a probability of 90% with respect to reporting a failure. The decision tree may then be used to identify types of events that may be correlated in order to ascertain whether a single premise will experience a power failure.

Thus, of the 101 failures of node 1501, 81 failures would have been predicted by selecting the prediction models of nodes 1503 (47 failures), 1509 (14 failures), 1513 (5 failures), 1523 (5 failures), 1535 (10 failures). By using a threshold of a 75% confidence factor for selecting models, a total of 81 failures would have been predicted, 3 of which would have been false detections. More failure could be predicted by including more message behavior models. By repairing the deficient grid elements before a customer generated outage is reported, instead of 101 outage reports generated during the period, only 23 (101-(81-3)) outage reports would have been generated, thereby yielding an over 75% reduction in customer generated outage reports associated with single premises failures and providing a potential advantage of significantly increased customer satisfaction and quality of service.

It should be further noted that end nodes may also be used to validate an absence of an outage. For example, if a message behavior corresponding to node 1539 was determined and yet an outage report was received from associated a suspect premises, then it may be determined that the outage report is erroneous, particularly if the outage report is from a premises generating chronic outage reports. Thus a repair crew would not be dispatched and a "bad roll" would be avoided. In a further example the approach could be applied to a group of premises to determine an absence of outages in a multiplicity of premises within the group of premises.

Thus, FIG. 8 through FIG. 15 illustrate among other things, a model generator coupled to the message database for generating a multiplicity of models based upon the messages and the outage reports, each model identifying a defective grid element based upon a message behavior of a smart meter associated with the defective grid element, the message behavior including a plurality of messages of a plurality of message types received from the smart meter, and a model selector for selecting a plurality of models from the multiplicity of models based upon a confidence factor.

The present disclosure has numerous other applications; it may be used to predict failures on other types of devices (single phase laterals or transformers) or in connection with other types of services (neutral legs on a service).

The foregoing description of possible implementations consistent with the method and system disclosed herein does not represent a comprehensive list of all such implementations or all variations of the implementations described. The description of only some implementation should not be construed as an intent to exclude other implementations. For example, artisans will understand how to implement the system and method disclosed herein in many other ways, using equivalents and alternatives that do not depart from the scope of the system and method disclosed herein. Moreover, unless indicated to the contrary in the preceding description, none of the components described in the implementations are essential to the system and method disclosed herein. It is thus intended that the specification and examples be considered as exemplary only.

What is claimed is:

1. A computer-implemented method for building a forecast model to predict outages before they occur in an electric power distribution grid comprising:
    accessing a message database coupled to a plurality of smart meters, the message database stores message data from the plurality of smart meters, each smart meter measuring electric power, delivered through one or more grid elements as part of a power distribution grid, consumed at each corresponding premise and each smart meter generating a multiplicity of message types related to electric power delivered thereto;
    accessing an outage report database of customer reported outages with deficient grid elements that have been repaired at each corresponding premise and each associated smart meter;
    processing the message data and the customer reported outages by a data mining engine to build a hierarchical decision tree model with a plurality of tree branches and tree nodes, with each of the tree nodes associated with one or more message types of the message data;
    identifying a subset of the plurality of tree branches and tree nodes from the hierarchical decision tree model based on a combination of
        i) the customer reported outages with the deficient grid elements that have been repaired at each corresponding premise, and
        ii) message data from each smart meter associated to the corresponding premise, wherein the identifying a subset of the plurality of tree branches and tree nodes from the hierarchical decision tree model includes using a ratio of first messages over second messages, the first messages including a first message type and the second messages including the first message type and at least a second message type, the ratio being greater than zero and less than one and wherein each of the first message type and the second message type are one of a Network Interface Card Based Power Fail Detect Disabled message, a History of Direct Current Detected message, a Network Interface Card Power Down message, a Service Error Cleared message, or smart meter equivalents thereto.

2. The method according to claim 1, wherein the multiplicity of message types is independent of information specifying the one or more grid elements.

3. The method according to claim 1, wherein the identifying a subset of the plurality of tree branches and tree nodes from the hierarchical decision tree model is independent of message data occurring beyond a time period.

4. The method according to claim 1, wherein the forecast model predicts outages prior to an occurrence of a fault with the one or more grid elements to the corresponding premise.

5. The method according to claim 1, wherein the forecast model predicts outages after an occurrence of a fault with the one or more grid elements to the corresponding premise, and generating a repair ticket occurs before receiving an outage notice associated with the premise, the outage notice being independent of the multiplicity of message types generated by the smart meter.

6. The method according to claim 1, wherein the hierarchical decision tree model is one of a C5.1 model and a CHAID model.

7. The method according to claim 1, further comprising:
    using the subset of the plurality of tree branches and tree nodes that have been identified to predict an absence of outages at the corresponding premise.

8. The method according to claim 1, wherein the using the subset of the plurality of tree branches and tree nodes that have been identified as a forecast model to predict outages at the corresponding premise is made independent of any weather information specifying any weather condition to which the electric power distribution grid may be exposed.

9. The method according to claim 1, further comprising:
    generating a repair ticket based upon using the forecast model to predict outages, wherein the repair ticket includes information identifying the corresponding premise.

10. The method according to claim 9, wherein the repair ticket includes information identifying the one or more grid elements.

11. The method according to claim 1, further comprising:
    filtering duplicate messages and messages from commercial industrial meters or other meters not associated with a single premise from the message database over a settable time period to produce filtered data prior to the processing of the message data and the customer reported outages by a data mining engine.

12. A non-transitory computer readable storage medium storing instructions for a computer to perform a method for building a forecast model to predict outages in an electric power distribution grid before they occur, the method comprising:
    accessing a message database coupled to a plurality of smart meters, the message database stores message data from the plurality of smart meters, each smart meter measuring electric power, delivered through one or more grid elements as part of a power distribution grid, consumed at each corresponding premise and each smart meter generating a multiplicity of message types related to electric power delivered thereto;
    accessing an outage report database of customer reported outages with deficient grid elements that have been repaired at each corresponding premise and each associated smart meter;
    processing the message data and the customer reported outages by a data mining engine to build a hierarchical decision tree model with a plurality of tree branches and tree nodes, with each of the tree nodes associated with one or more message types of the message data;
    identifying a subset of the plurality of tree branches and tree nodes from the hierarchical decision tree model based on a combination of
        i) the customer reported outages with the deficient grid elements that have been repaired at each corresponding premise, and
        ii) message data from each smart meter associated to the corresponding premise wherein the identifying a subset of the plurality of tree branches and tree nodes from the hierarchical decision tree model includes using a ratio of first messages over second messages, the first messages including a first message type and the second messages including the first message type and at least a second message type, the ratio being greater than zero and less than one and wherein each of the first message type and the second message type are one of a Network Interface Card Based Power Fail Detect Disabled message, a History of Direct Current Detected message, a Network Interface Card Power Down message, a Service Error Cleared message, or smart meter equivalents thereto.

13. The non-transitory computer readable storage medium of claim 12, wherein the multiplicity of message types is independent of information specifying the one or more grid elements.

14. The non-transitory computer readable storage medium of claim 12, wherein the hierarchical decision tree model is one of a C5.1 model and a CHAID model.

15. The non-transitory computer readable storage medium of claim 12, wherein the identifying a subset of the plurality of tree branches and tree nodes from the hierarchical decision tree model based on a combination of the customer reported outages with the grid elements that have been repaired at each corresponding premise and message data from each smart meter associated to the corresponding premise is independent of message data occurring beyond a time period.

16. The non-transitory computer readable storage medium of claim 12, further comprising:
generating a repair ticket based upon the using the subset of the plurality of tree branches and tree nodes that have been identified as a forecast model to predict outages at the corresponding premise.

17. The non-transitory computer readable storage medium of claim 12, further comprising:
filtering duplicate messages and messages from commercial industrial meters or other meters not associated with a single premise from the message database over a settable time period to produce filtered data prior to the processing of the message data and the customer reported outages by a data mining engine.

18. A system for building a forecast model to predict outages before they occur in maintaining an electric power distribution grid comprising:
a processor; and
a memory coupled to the processor, wherein the memory comprises instructions which, when executed by the processor, cause the processor to perform:
accessing a message database coupled to a plurality of smart meters, the message database stores message data from the plurality of smart meters, each smart meter measuring electric power, delivered through one or more grid elements as part of a power distribution grid, consumed at each corresponding premise and each smart meter generating a multiplicity of message types related to electric power delivered thereto;
accessing an outage report database of customer reported outages with deficient grid elements that have been repaired at each corresponding premise and each associated smart meter;
processing the message data and the customer reported outages by a data mining engine to build a hierarchical decision tree model with a plurality of tree branches and tree nodes, with each of the tree nodes associated with one or more message types of the message data;
identifying a subset of the plurality of tree branches and tree nodes from the hierarchical decision tree model based on a combination of
i) the customer reported outages with the deficient grid elements that have been repaired at each corresponding premise, and
ii) message data from each smart meter associated to the corresponding premise wherein the identifying a subset of the plurality of tree branches and tree nodes from the hierarchical decision tree model includes using a ratio of first messages over second messages, the first messages including a first message type and the second messages including the first message type and at least a second message type, the ratio being greater than zero and less than one and wherein each of the first message type and the second message type are one of a Network Interface Card Based Power Fail Detect Disabled message, a History of Direct Current Detected message, a Network Interface Card Power Down message, a Service Error Cleared message, or smart meter equivalents thereto.

19. The system according to claim 18, wherein the hierarchical decision tree model is one of a C5.1 model and CHAID model.

20. The system according to claim 18, further comprising:
filtering duplicate messages and messages from commercial industrial meters or other meters not associated with a single premise from the message database over a settable time period to produce filtered data prior to the processing of the message data and the customer reported outages by a data mining engine.

21. The system according to claim 20, wherein the filtering includes at least one of selecting messages of a predetermined message type and selecting messages according to a rate of occurrence of the message.

22. The system according to claim 18, wherein the forecast model predicts outages prior to an occurrence of a fault with the one or more grid elements to the corresponding premise.

23. The system according to claim 18, further comprising:
using the subset of the plurality of tree branches and tree nodes that have been identified to predict an absence of outages at the corresponding premise.

24. The system according to claim 18, further comprising:
generating a repair ticket based upon using the forecast model to predict outages, wherein the repair ticket includes information identifying the corresponding premise, wherein the repair ticket includes information identifying the one or more grid elements.

25. A computer-implemented method for predicting future outages of one or more grid elements in an electric power distribution grid before they occur comprising:
accessing a message database coupled to a plurality of smart meters, the message database stores message data from the plurality of smart meters, each smart meter measuring electric power, delivered through the one or more grid elements in the power distribution grid, consumed at each corresponding premise and each smart meter generating a multiplicity of message types related to electric power delivered thereto;
accessing an outage report database of customer reported outages with deficient grid elements that have been repaired at each corresponding premise and each associated smart meter;
training a data mining engine with the message data and the customer reported outages to produce a plurality of models;
identifying a subset of the plurality of models based on a combination of
i) the customer reported outages with the deficient grid elements that have been repaired at each corresponding premise, and
ii) message data from each smart meter associated to the corresponding premise; wherein the identifying a subset of the plurality of models includes using a ratio of first messages over second messages, the first messages including a first message type and the second messages including the first message type and at least a second message type, the ratio being greater than zero and less than one and wherein each of the first message type and the second message type are one of a Network Interface Card Based Power Fail Detect Disabled message, a History of Direct Current Detected message, a Network Interface Card Power Down message, a Service Error Cleared message, or smart meter equivalents thereto; and using the subset of the models that have been identified as a forecast model to predict outages at the corresponding premise, wherein the forecast model predicts outages prior to an occurrence of a fault with the one or more grid elements to the corresponding premise.

26. The method according to claim 25, wherein the multiplicity of message types is independent of information specifying the one or more grid elements.

27. The method according to claim 25, wherein the using the subset of the models that have been identified as a forecast model to predict outages at the corresponding premise is made independent of any weather information specifying any weather condition to which the electric power distribution grid may be exposed.

28. The method according to claim 25, further comprising:
generating a repair ticket based upon the forecast model to predict outages, wherein the repair ticket includes information identifying the corresponding premise.

29. The method according to claim 28, wherein the repair ticket includes information identifying the one or more grid elements.

30. The method according to claim 25, wherein the model produced by the data mining engine is a hierarchical decision tree model.

31. The method according to claim 30, wherein the hierarchical decision tree model includes a plurality of tree branches and tree nodes, with each of the tree nodes associated with one or more message types of the message data, whereby the tree nodes associated with one or more message types which have been previously ranked as most relevant in identifying one or more of the grid elements as defective grid elements are positioned nearest to node zero, the earliest ancestral node, in the hierarchical decision tree model.

32. The method according to claim 25, further comprising:
filtering duplicate messages and messages from commercial industrial meters or other meters not associated with a single premise from the message database over a settable time period to produce filtered data prior to the training the data mining engine.

* * * * *